(12) United States Patent
Lee et al.

(10) Patent No.: US 9,576,339 B2
(45) Date of Patent: *Feb. 21, 2017

(54) MOBILE TERMINAL, DISPLAY DEVICE AND CONTROLLING METHOD THEREOF

(71) Applicant: LG Electronics Inc., Seoul (KR)

(72) Inventors: Byoungwook Lee, Seoul (KR); Woongchang Kim, Seoul (KR); Jeongseop Hwang, Seoul (KR); Kangwon Zhang, Seoul (KR); Jongsung Lee, Seoul (KR); Chanphill Yun, Seoul (KR); Eungkyu Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,775

(22) Filed: Oct. 8, 2015

(65) Prior Publication Data

US 2016/0027150 A1    Jan. 28, 2016

Related U.S. Application Data

(63) Continuation of application No. 14/802,774, filed on Jul. 17, 2015, which is a continuation of application (Continued)

(30) Foreign Application Priority Data

Aug. 13, 2010    (KR) ................. PCT/KR2010/005341

(51) Int. Cl.
*H04M 3/00*    (2006.01)
*H04M 1/00*    (2006.01)
(Continued)

(52) U.S. Cl.
CPC ............... *G06T 3/60* (2013.01); *G06F 1/1626* (2013.01); *G06F 3/0346* (2013.01);
(Continued)

(58) Field of Classification Search
CPC ............ H04M 2250/16; H04M 1/0214; H04M 1/72527; H04W 88/02
(Continued)

(56) References Cited

U.S. PATENT DOCUMENTS 5,721,849 A * 2/1998 Amro ..................... G06F 3/0481
715/802
7,657,227 B2 * 2/2010 Doan ................... H04M 1/7253
345/169

(Continued)

FOREIGN PATENT DOCUMENTS

CN    1674600 A    9/2005
CN    101188104 A    5/2008
(Continued)

OTHER PUBLICATIONS

Youtube Video "Android CARPC: HTC Droid Incredible TV-OUT Range Rover Sport" (uploaded on Jul. 14, 2010, http://www.youtube.com/watch?v=etztEqrU6Mg).

(Continued)

*Primary Examiner* — Dung Hong
(74) *Attorney, Agent, or Firm* — Birch, Stewart, Kolasch & Birch, LLP

(57) ABSTRACT

A display device including an interface unit configured to be connected to a mobile terminal having a first display unit displaying a mobile screen image; a second display unit for displaying a monitor window having two orientation directions; and a controller configured to display the monitor window in a first orientation direction for displaying a monitor screen image corresponding to the mobile screen (Continued)

image on the second display unit; receive a user command relating to a modification of the mobile screen image; transmit a control signal relating to the user command to the mobile terminal; and display a modified monitor screen image in response to the user command on a second orientation direction of the monitor window.

25 Claims, 32 Drawing Sheets

Related U.S. Application Data

No. 13/149,096, filed on May 31, 2011, now Pat. No. 9,122,392.

(51) Int. Cl.
| | | |
|---|---|---|
| H04B 1/38 | (2015.01) | |
| G09G 5/00 | (2006.01) | |
| G06T 3/60 | (2006.01) | |
| G06F 3/0484 | (2013.01) | |
| G06F 3/0482 | (2013.01) | |
| G06F 3/0488 | (2013.01) | |
| G06F 1/16 | (2006.01) | |
| G06F 3/0346 | (2013.01) | |
| G06F 3/14 | (2006.01) | |
| G06T 3/40 | (2006.01) | |
| G09G 3/20 | (2006.01) | |
| H04M 1/725 | (2006.01) | |

(52) U.S. Cl.
CPC ........ *G06F 3/0482* (2013.01); *G06F 3/04847* (2013.01); *G06F 3/04883* (2013.01); *G06F 3/04886* (2013.01); *G06F 3/1423* (2013.01); *G06T 3/40* (2013.01); *G09G 3/2092* (2013.01); *G06F 2200/1614* (2013.01); *G06F 2203/04803* (2013.01); *G06F 2203/04808* (2013.01); *G09G 2370/16* (2013.01); *H04M 1/7253* (2013.01); *H04M 2250/12* (2013.01)

(58) Field of Classification Search
USPC .......... 455/418–419, 550.1, 556.1, 557, 566; 345/1.1–3.4, 4–6
See application file for complete search history.

(56) References Cited

U.S. PATENT DOCUMENTS

| | | | | |
|---|---|---|---|---|
| 8,937,590 | B2* | 1/2015 | Hachiya | G06F 3/03547 345/1.1 |
| 2004/0021681 | A1* | 2/2004 | Liao | G06F 1/1616 715/702 |
| 2004/0104862 | A1* | 6/2004 | Ogura | G06F 3/1431 345/1.1 |
| 2004/0119660 | A1* | 6/2004 | Okuley | G06F 3/1454 345/2.1 |
| 2004/0252074 | A1* | 12/2004 | Schaper | G06F 3/1431 345/1.1 |
| 2005/0125570 | A1* | 6/2005 | Olodort | G06F 1/162 710/15 |
| 2005/0143124 | A1* | 6/2005 | Kennedy | G06F 1/1626 455/556.1 |
| 2005/0212764 | A1 | 9/2005 | Toba | |
| 2006/0248471 | A1* | 11/2006 | Lindsay | G06F 3/0481 715/800 |
| 2007/0085759 | A1* | 4/2007 | Lee | G06F 1/1616 345/1.1 |
| 2007/0271525 | A1* | 11/2007 | Han | G06F 3/017 715/786 |
| 2008/0068344 | A1* | 3/2008 | Kim | G06F 3/0481 345/173 |
| 2008/0248834 | A1 | 10/2008 | Chatterjee et al. | |
| 2009/0002391 | A1* | 1/2009 | Williamson | G06F 1/1626 345/619 |
| 2009/0031248 | A1 | 1/2009 | Kano et al. | |
| 2009/0075697 | A1* | 3/2009 | Wilson | A01G 23/04 455/557 |
| 2009/0153434 | A1* | 6/2009 | Cheng | G06F 3/1454 345/1.1 |
| 2009/0190742 | A1* | 7/2009 | Freeman | H04M 3/436 379/265.09 |
| 2009/0195513 | A1* | 8/2009 | Dybalski | G06F 3/0488 345/173 |
| 2010/0053164 | A1* | 3/2010 | Imai | G06F 3/011 345/427 |
| 2010/0105428 | A1* | 4/2010 | Kim | G03B 21/14 455/556.1 |
| 2010/0261506 | A1* | 10/2010 | Rajamani | H04M 1/7253 455/566 |
| 2010/0295803 | A1 | 11/2010 | Kim et al. | |
| 2010/0321275 | A1 | 12/2010 | Hinckley et al. | |
| 2011/0012926 | A1* | 1/2011 | Kerr | G06F 1/1626 345/649 |
| 2011/0112819 | A1* | 5/2011 | Shirai | G06F 9/4445 703/21 |
| 2011/0181496 | A1* | 7/2011 | Lanier | G06Q 20/102 345/2.2 |

FOREIGN PATENT DOCUMENTS

| | | |
|---|---|---|
| KR | 10-2007-0015239 A | 2/2007 |
| KR | 10-2010-0072102 A | 6/2010 |
| WO | WO 2006/110894 A1 | 10/2006 |
| WO | WO 2010/048539 A1 | 4/2010 |

OTHER PUBLICATIONS

YouTube Video, Ty Moss, "Veency-Control your iPhone/iPod Touch from your computer," (Uploaded on Oct. 7, 2008, https://youtube.com/watch?v=p2jjT2kDsQY), 4 pages, XP054976455.

YouTube Video, Yellow Brother, "Android CARPC: HTC Droid incredible TV-OUT Range Rover Sport," (uploaded on Jul. 14, 2010, https://www.youtube.com/watch?v=etzEqrU6Mg), 3 pages, XP054976454.

* cited by examiner

FIG. 5
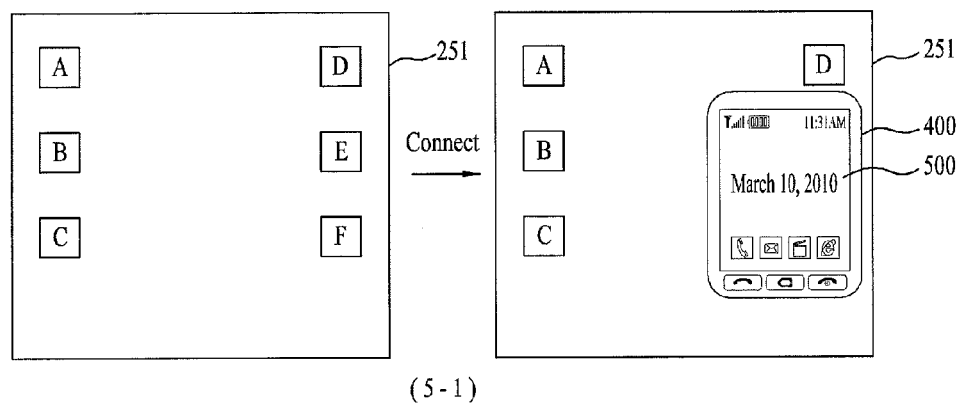
(5-1)
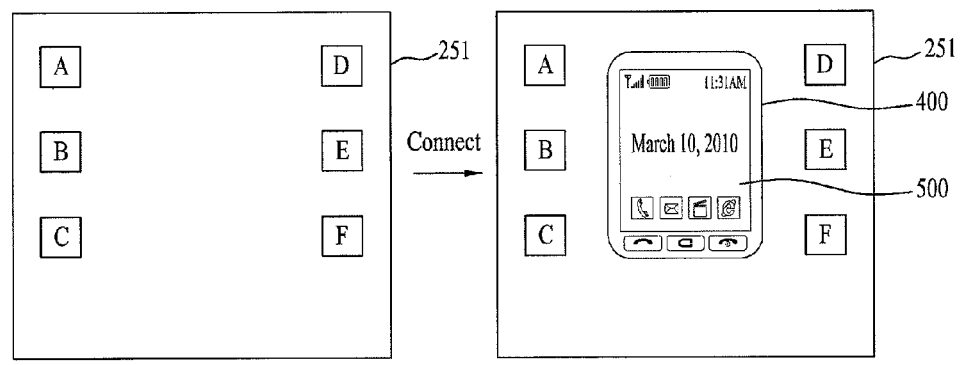
(5-2)
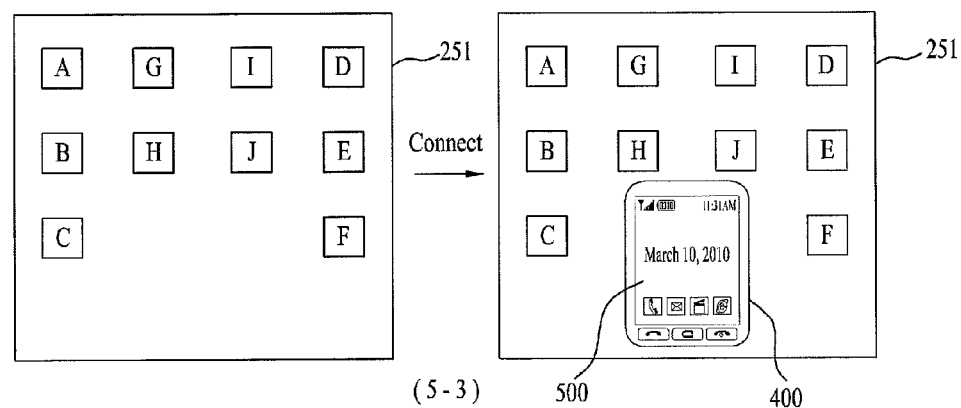
(5-3)

FIG. 6
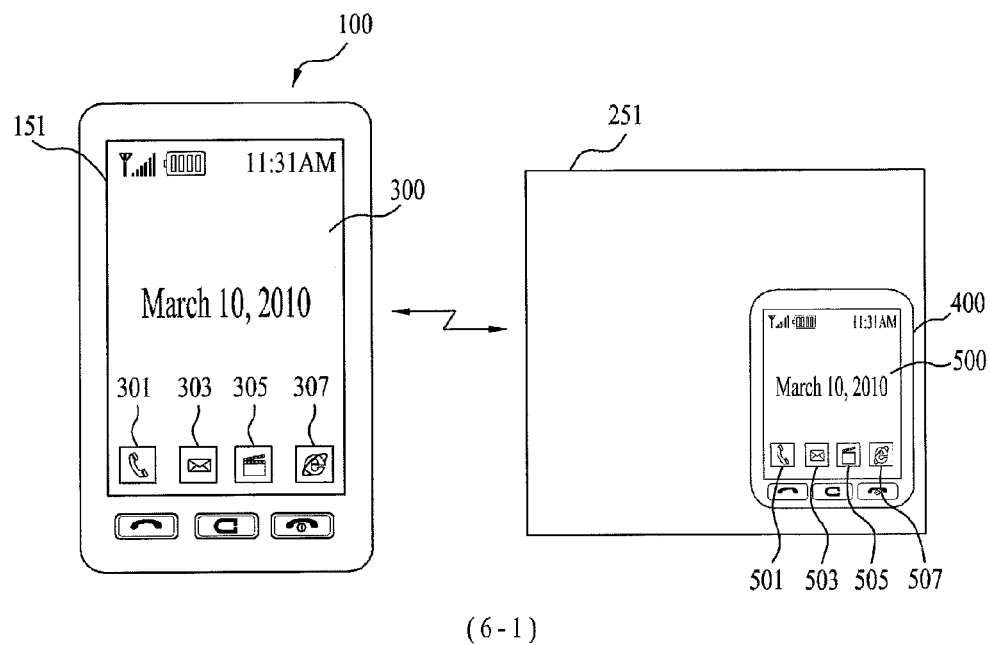
(6-1)
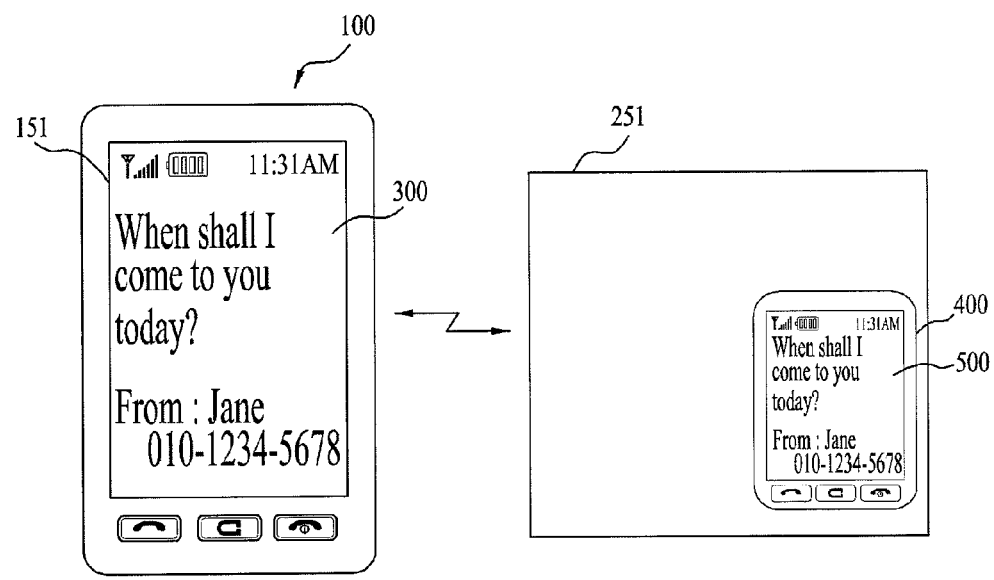

FIG. 9
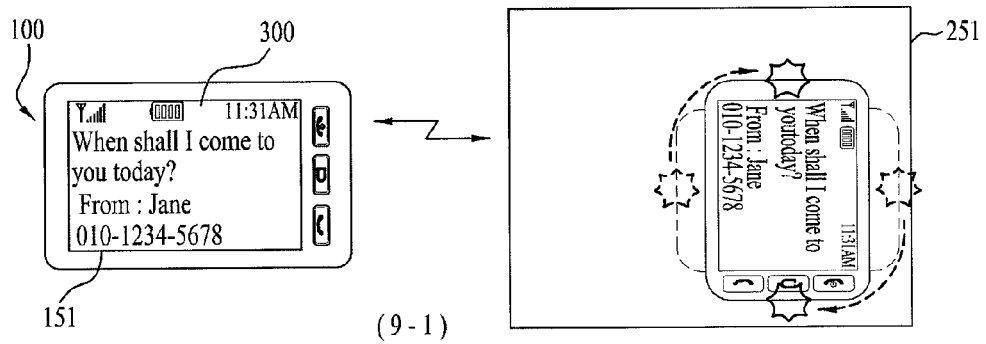
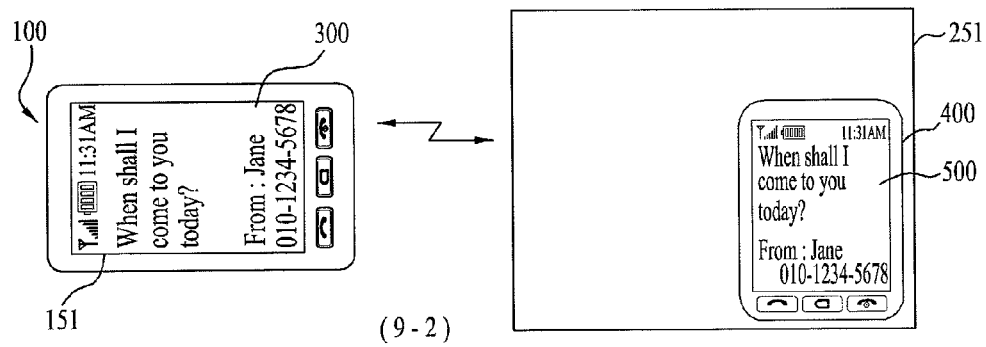
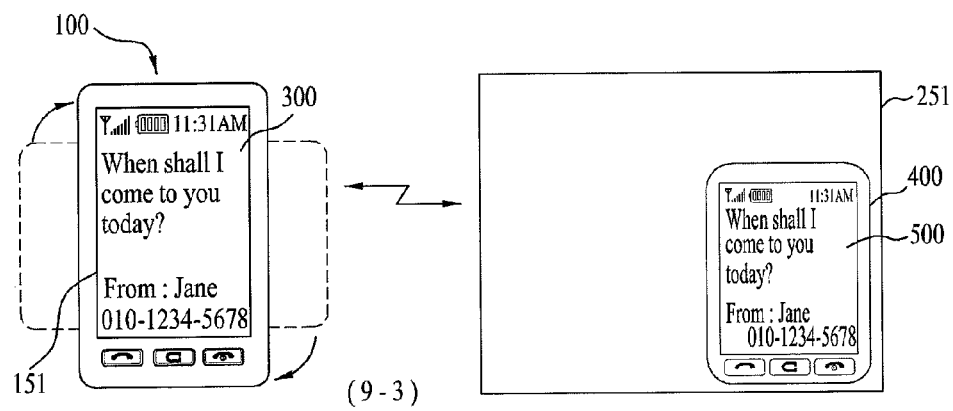

FIG. 10
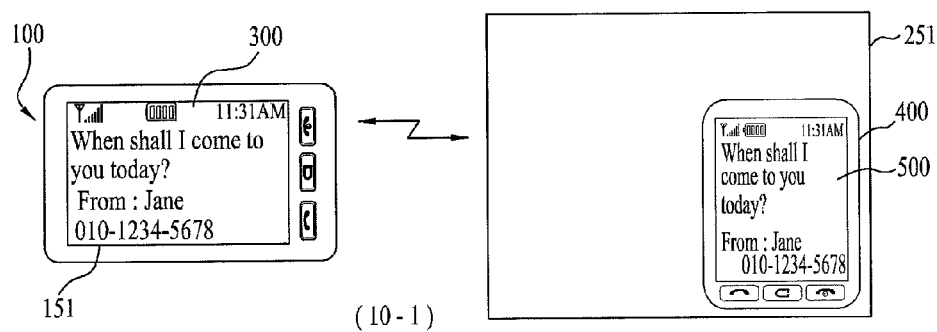
(10-1)
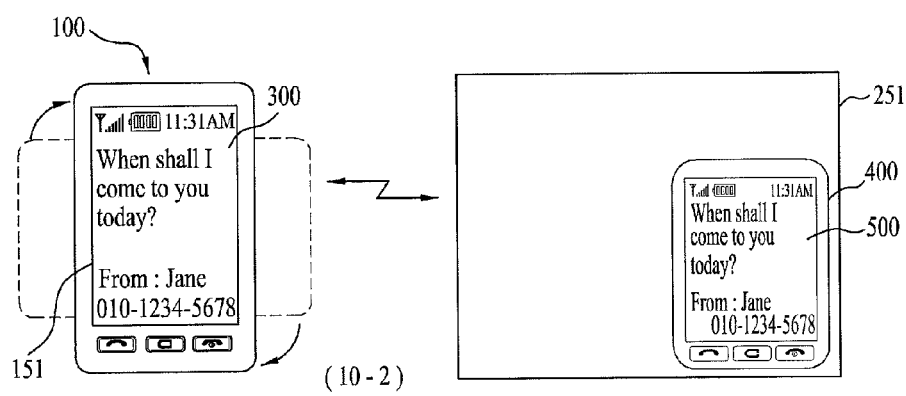
(10-2)

FIG. 24
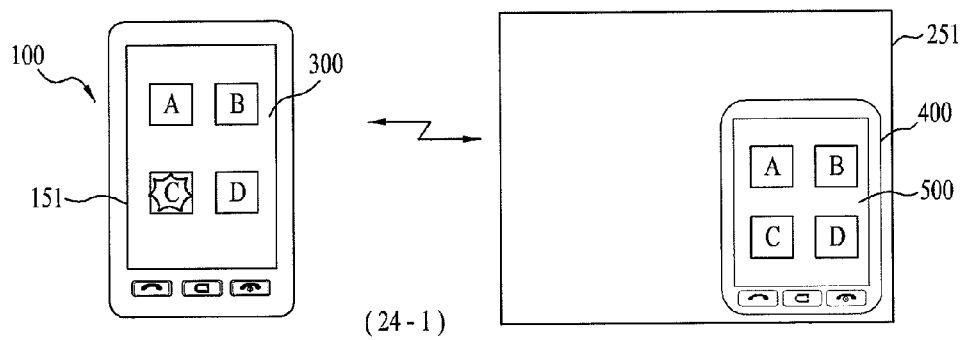
(24-1)
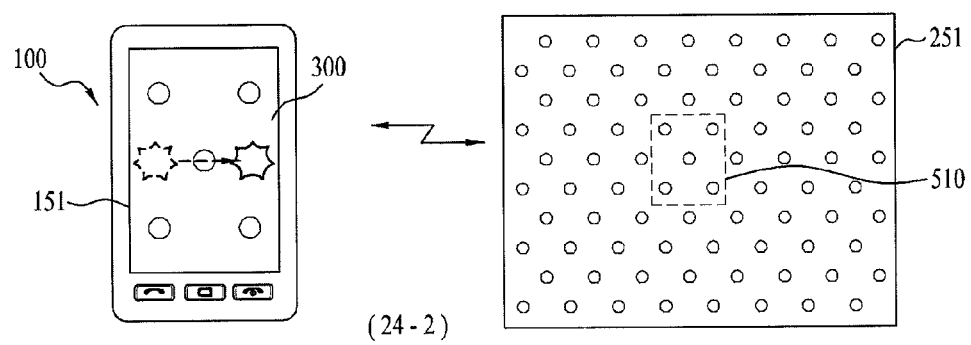
(24-2)
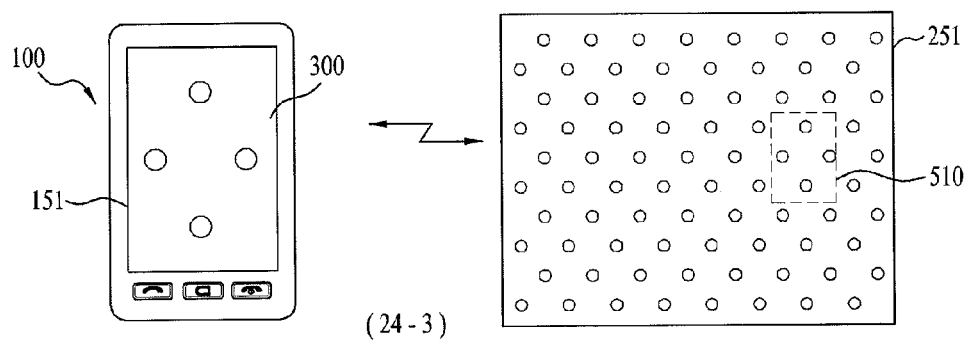
(24-3)

FIG. 26
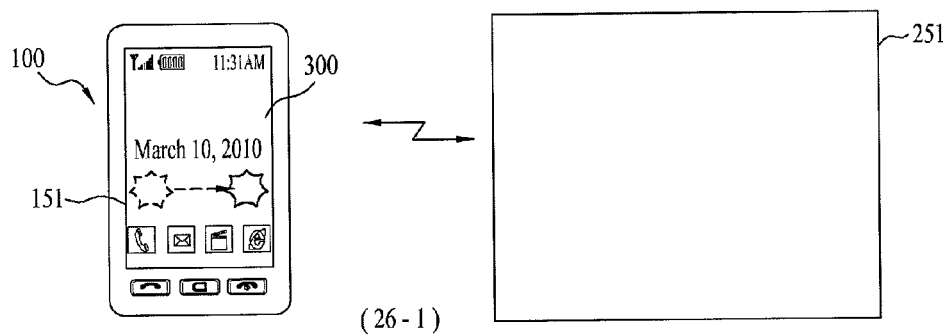
(26-1)
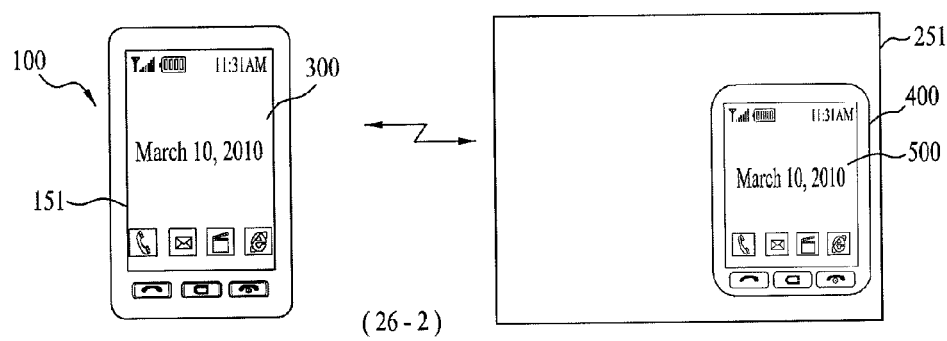
(26-2)
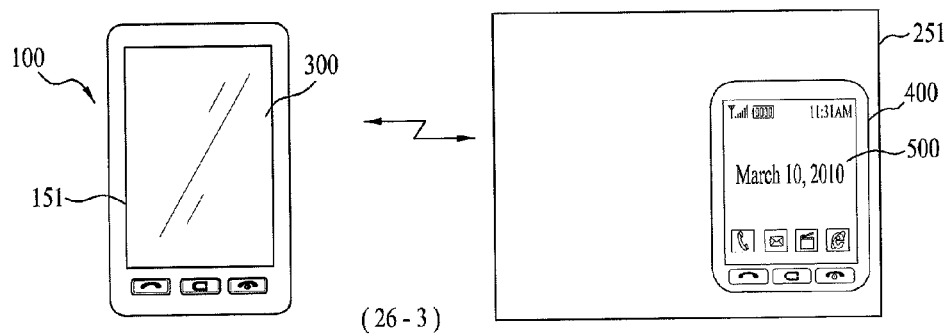
(26-3)

FIG. 28
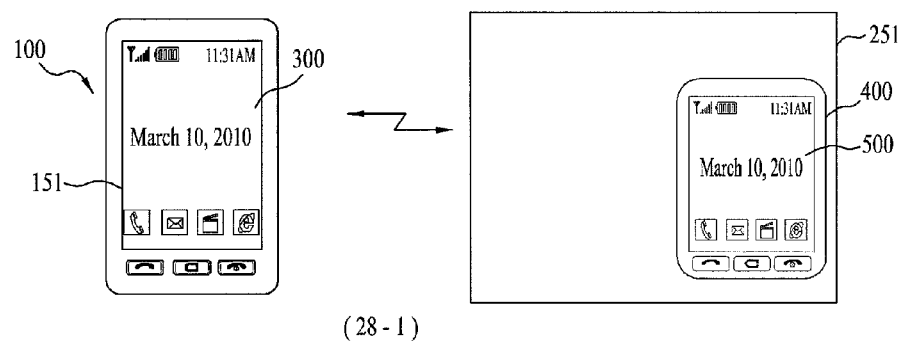
(28-1)
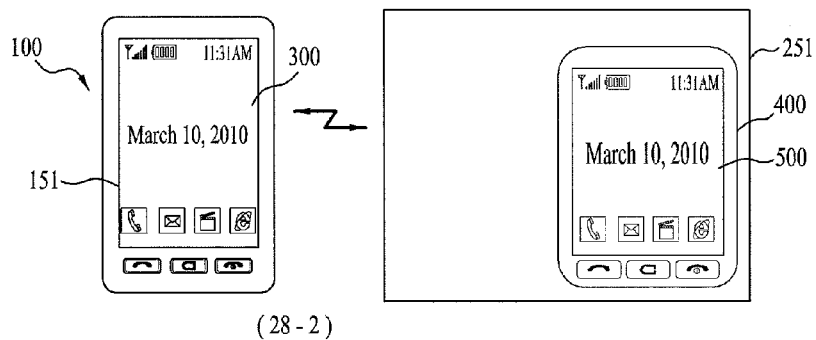
(28-2)
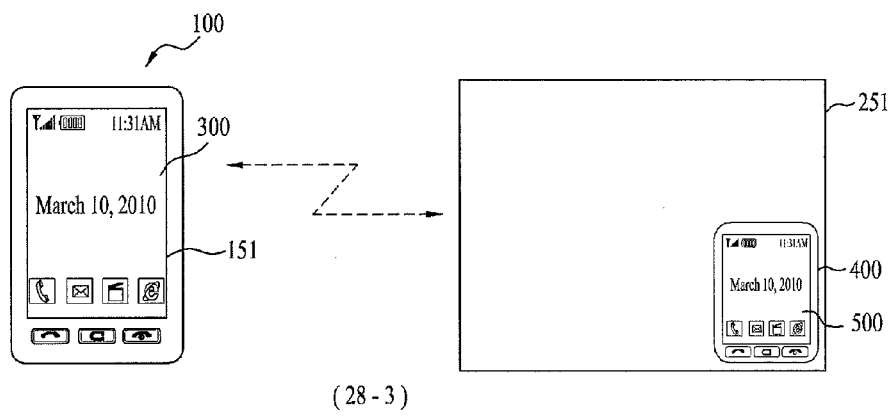
(28-3)

FIG. 30
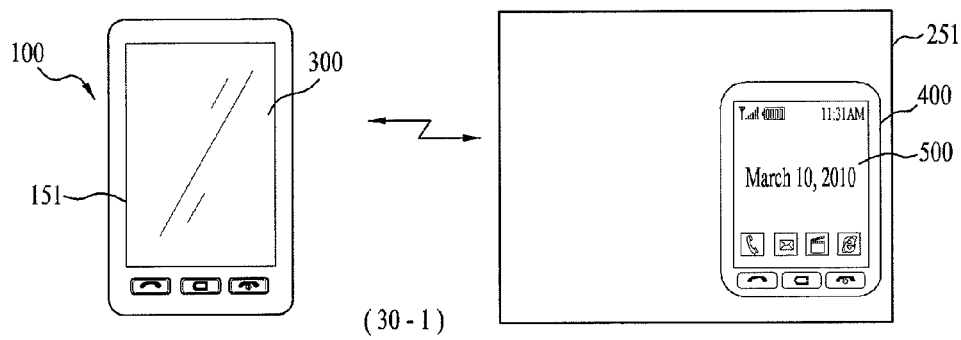
(30-1)
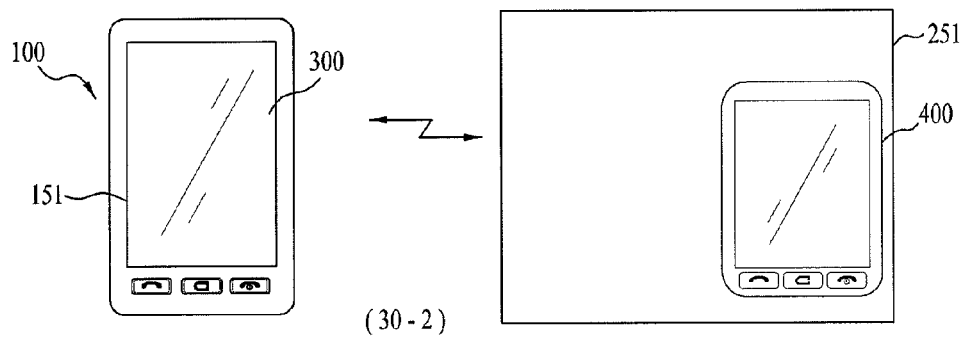
(30-2)
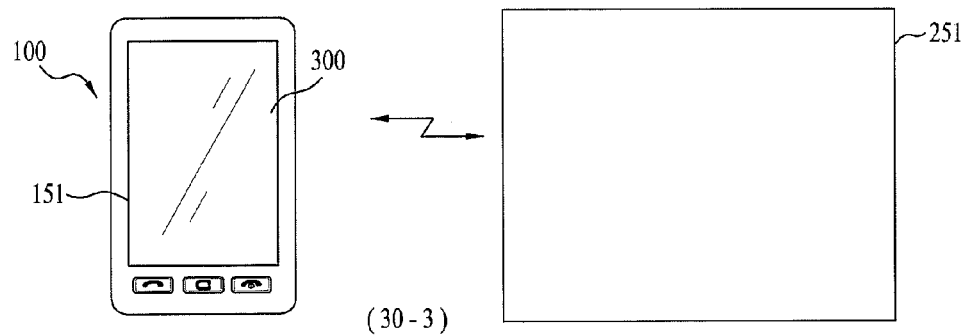
(30-3)

FIG. 32
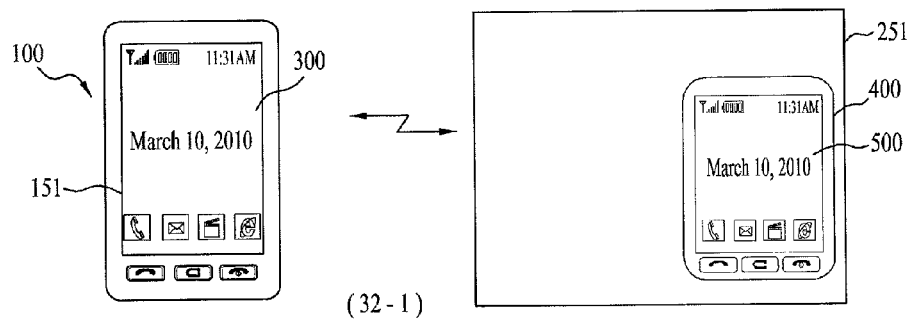
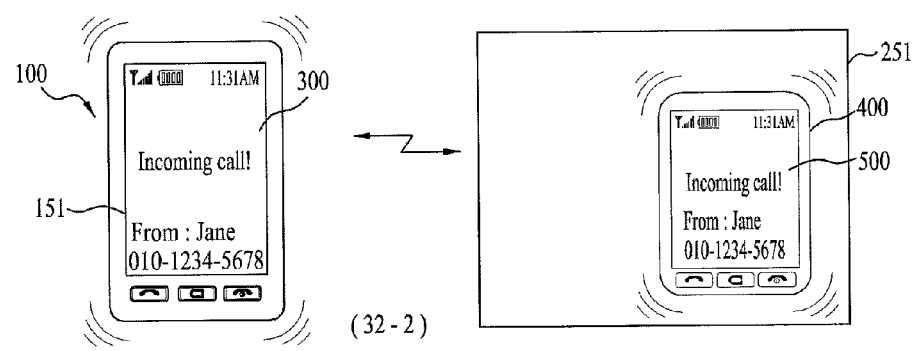
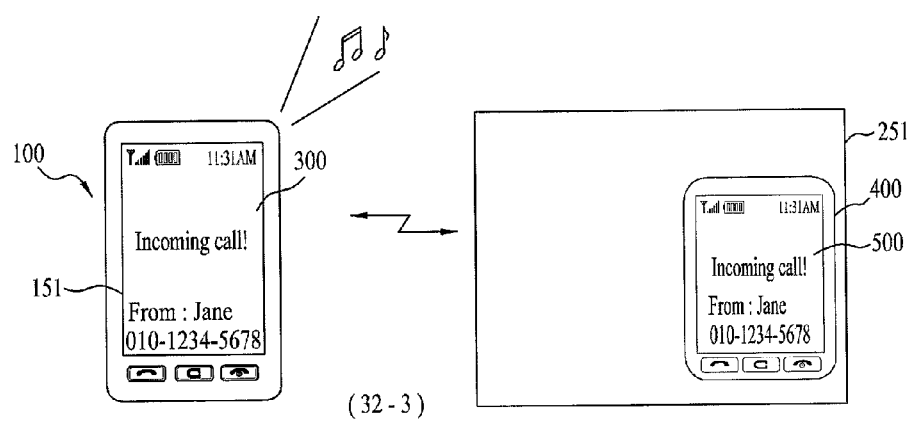

MOBILE TERMINAL, DISPLAY DEVICE AND CONTROLLING METHOD THEREOF

CROSS REFERENCE TO RELATED APPLICATIONS

This application is a Continuation of co-pending U.S. application Ser. No. 14/802,774 filed on Jul. 17, 2015, which is a Continuation of U.S. application Ser. No. 13/149,096 (now U.S. Pat. No. 9,122,392) filed on May 31, 2011, which claims the benefit of the International Patent Application No. PCT/KR2010/005341 filed on Aug. 13, 2010. The entire contents of these applications are hereby incorporated by reference as fully set forth herein.

BACKGROUND OF THE INVENTION

Field of the Invention

The present invention relates to a mobile terminal, and more particularly, to a mobile terminal, display device and controlling method thereof. Although the present invention is suitable for a wide scope of applications, it is particularly suitable for enabling data communications between a mobile terminal and a display device when the mobile terminal and the display device are connected together in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

The mobile terminal is connected to such a display device as a notebook computer, a tablet computer, a personal computer, a television set and the like by wire or wireless and can then perform data communications in-between. When the data communications are performed between the mobile terminal and the display device, the demand for a method of displaying information on the data communications in-between on the mobile terminal and the display device is ongoing.

SUMMARY OF THE INVENTION

Accordingly, the present invention is directed to a mobile terminal, display device and controlling method thereof that substantially obviate one or more problems due to limitations and disadvantages of the related art.

An object of the present invention is to provide a mobile terminal, display device and controlling method thereof, by which when the data communications are performed between the mobile terminal and the display device, information on the data communications in-between can be displayed on the mobile terminal and the display device in further consideration of terminal user's convenience.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a housing, a sensor unit configured to sense an orientation direction of the housing, a first display unit provided to one side of the housing, the first display unit configured to display a first screen image, an interface unit configured to be connected to an external display device having a second display unit, and a controller configured to: control a monitor window for displaying a second screen image corresponding to the first screen image to be generated from the second display unit by providing information on the first screen image to the external display device, and control the monitor window to be displayed within the second display unit according to the orientation direction of the housing by providing the sensed orientation direction of the housing to the external display device.

In another aspect of the present invention, a display device includes an interface unit configured to connect an external mobile terminal having a first display unit displaying a first screen image thereon, a second display unit, and a controller configured to: control a monitor window displaying a second screen image corresponding to the first screen image to be generated from the second display unit by receiving information on the first screen image from the external mobile terminal, receive an orientation direction of a housing of the mobile terminal, and control the monitor window to be displayed on the second display unit in the received orientation direction.

In another aspect of the present invention, a method of controlling a mobile terminal includes displaying a first screen image on a first display unit provided to one side of a housing of the mobile terminal, connecting the mobile terminal to an external display device having a second display unit, providing information on the first screen image to the external display device, controlling a monitor window displaying a second screen image corresponding to the first screen image to be generated from the second display unit, sensing an orientation direction of the housing and providing the sensed orientation direction of the housing to the external display device to control the monitor window to be displayed along the sensed orientation direction.

In another aspect of the present invention, a method of controlling a display device includes connecting an external mobile terminal having a first display unit displaying a first screen image thereon to the display device having a second display unit, controlling a monitor window displaying a second screen image corresponding to the first screen image to be generated from the second display unit by receiving information on the first screen image from the external mobile terminal, receiving an orientation direction of a housing of the external mobile terminal, and controlling the monitor window to be displayed on the second display unit in the received orientation direction.

In another aspect of the present invention, a mobile terminal includes a first display unit configured to display a first screen image thereon, an interface unit configured to be connected to an external display device having a second display unit, and a controller configured to control a monitor window for displaying a second screen image corresponding to the first screen image to be generated on the second display unit by providing information on the first screen image to the external display device, and control the monitor window to be enlarged on the second display unit when the first screen image is zoomed in on the first display unit.

In another aspect of the present invention, a display device includes an interface unit configured to be connected to an external mobile terminal having a first display unit displaying a first screen image thereon, a second display unit, and a controller configured to control a monitor window displaying a second screen image corresponding to the first screen image to be generated on the second display unit by receiving information on the first screen image from the external mobile terminal, and control the monitor window to be enlarged on the second display unit when the first screen image is zoomed in on the first display unit.

In another aspect of the present invention, a method of controlling a mobile terminal includes displaying a first screen image on a first display unit provided to one side of a housing of the mobile terminal, connecting the mobile terminal to an external display device having a second display unit, providing information on the first screen image to the external display device, controlling a monitor window for displaying a second screen image corresponding to the first screen image to be generated on the second display unit, and controlling the monitor window to be enlarged on the second display unit when the first screen image is zoomed in on the first display unit.

In another aspect of the present invention, a method of controlling a display device includes connecting an external mobile terminal having a first display unit displaying a first screen image thereon to the display device having a second display unit, controlling a monitor window displaying a second screen image corresponding to the first screen image to be generated on the second display unit by receiving information on the first screen image from the external mobile terminal, and controlling the monitor window to be enlarged on the second display unit when the first screen image is zoomed in on the first display unit.

In another aspect of the present invention, a display device includes a first display unit configured to display a first display unit configured to display a first screen image thereon, an interface unit configured to be connected to an external display device having a second display unit, and a controller configured to: control a monitor window for displaying a second screen image corresponding to the first screen image to be generated on the second display unit by providing information on the first screen image to the external display device, and control the second screen image to be zoomed out when the monitor window is enlarged on the second display unit.

In another aspect of the present invention, a display device includes an interface unit configured to connect an external mobile terminal having a first display unit displaying a first screen image thereon, a second display unit, and a controller configured to: control a monitor window displaying a second screen image corresponding to the first screen image to be generated on the second display unit by receiving information on the first screen image from the external mobile terminal, and control the second screen image to be zoomed out when the monitor window is enlarged on the second display unit.

In another aspect of the present invention, a method of controlling a mobile terminal includes displaying a first screen image on a first display unit provided to one side of a housing of the mobile terminal, connecting the mobile terminal to an external display device having a second display unit, providing information on the first screen image to the external display device, controlling a monitor window for displaying a second screen image corresponding to the first screen image to be generated on the second display unit, and controlling the second screen image to be zoomed out when the monitor window is enlarged on the second display unit.

In a further aspect of the present invention, a method of controlling a display device includes connecting the display device having a second display unit to an external mobile terminal having a first display unit displaying a first screen image thereon, controlling a monitor window displaying a second screen image corresponding to the first screen image to be generated on the second display unit by receiving information on the first screen image from the external mobile terminal, and controlling the second screen image to be zoomed out when the monitor window is enlarged on the second display unit.

Accordingly, the present invention provides the following effects and/or advantages.

First of all, according to at least one of the embodiments of the present invention, as the mobile terminal and the display device are connected to each other, when a monitor window related to a display of the mobile terminal is displayed on the display device, a terminal user is facilitated to switch an orientation direction of the monitor by switching an orientation direction of a housing of the mobile terminal if necessary.

Secondly, according to at least one of the embodiments of the present invention, when the monitor window related to the display of the mobile terminal is displayed on the display device, the monitor window is displayed by not blocking a previous object displayed on the display device. Therefore, the present invention can prevent the inconvenience that may be caused to a terminal user as the monitor window blocks the previous object.

Thirdly, according to at least one of the embodiments of the present invention, a zoom-in or zoom-out of the display of the mobile terminal, a zoom-in (or enlargement) or zoom-out (or reduction) of the display within the monitor window, and an enlargement and reduction of the monitor window itself are performed as being organically associated with each other, whereby a terminal user is further facilitated to view the display of the mobile terminal and the display of the display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 5 is a diagram of screens of a display unit of a display device according to an embodiment of the present invention;

FIGS. 6 and 7 are diagrams of a front side of a mobile terminal and a display unit of a display device according to an embodiment of the present invention;

FIGS. 9 and 10 are diagrams of a front side of a mobile terminal and a display unit of a display device according to an embodiment of the present invention;

FIG. 24 is a diagram of a front side of a mobile terminal and a display unit of a display device according to an embodiment of the present invention;

FIG. 26 is a diagram of a front side of a mobile terminal and a display unit of a display device according to an embodiment of the present invention;

FIG. 28 is a diagram of a front side of a mobile terminal and a display unit of a display device according to an embodiment of the present invention;

FIG. 30 is a diagram of a front side of a mobile terminal and a display unit of a display device according to an embodiment of the present invention;

FIG. 32 is a diagram of a front side of a mobile terminal and a display unit of a display device according to an embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

First of all, a mobile terminal according to the present invention is described as follows.

The present invention can be applicable to a various types of terminals. Examples of such terminals include mobile terminals, such as mobile phones, smart phones, notebook computers (laptop computers), digital broadcast terminals, personal digital assistants, portable multimedia players (PMP) and navigators.

Figure 1:
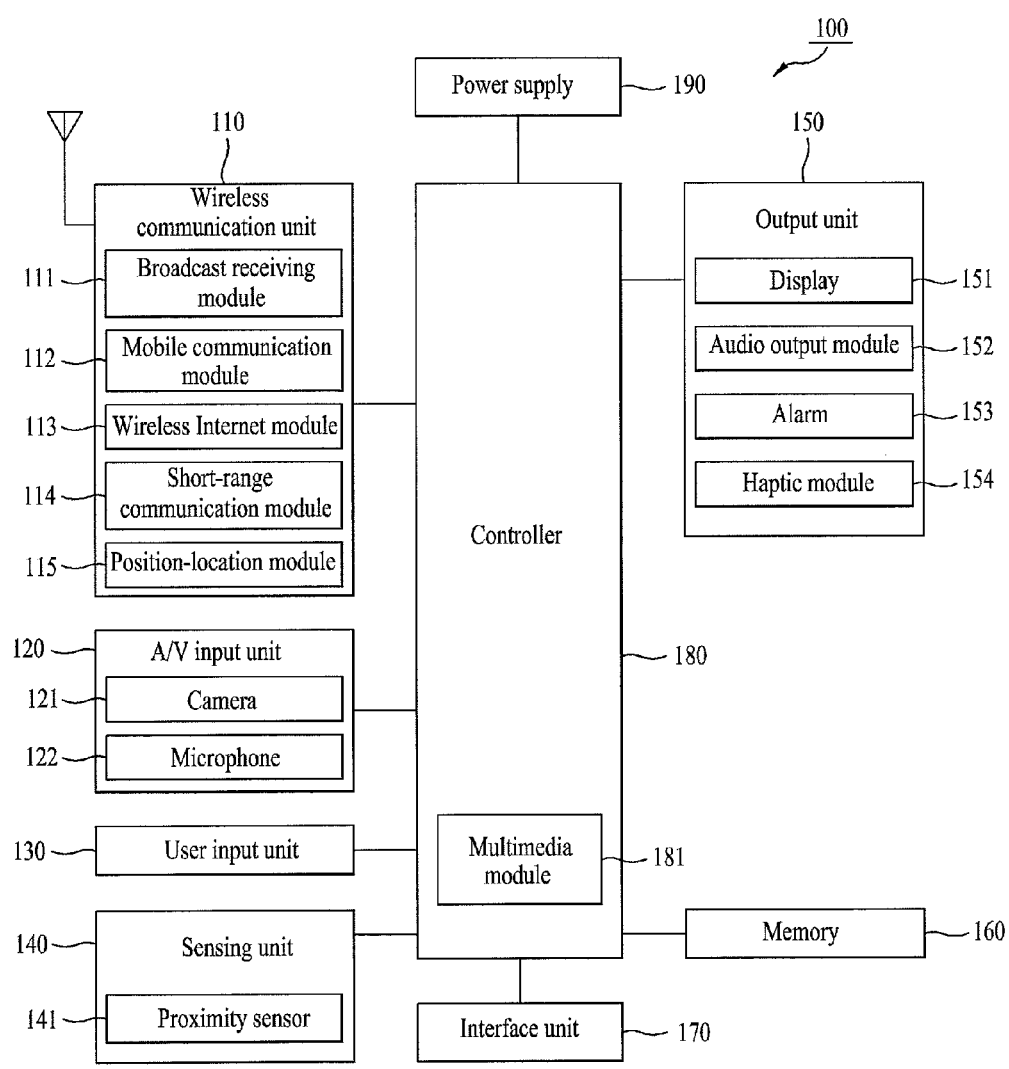
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this instance, the broadcast associated information can be received by the mobile communication module 112.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. For example, the sensing unit 140 includes at least one of a gyroscope sensor, acceleration sensor, a geomagnetic sensor and the like. As an example, consider the mobile terminal 100 being configured as a slide-type mobile terminal. In this configuration, the sensing unit 140 may sense whether a sliding portion of the mobile terminal 100 is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal 100 is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 as being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), the display 151 can be an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor can be configured to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 knows whether a prescribed portion of the display 151 is touched.

Referring to FIG. 1, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

The proximity sensor 141 detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output as being synthesized together or can be output in sequence.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

Considering that the wireless internet module 113 and the short-range communication module 114 are usable as the wireless data ports, each of the wireless internet module 113 and the short-range communication module 114 can be understood as a sort of the interface unit 170.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

In the above description, so far, the mobile terminal 100 according to an embodiment of the present invention is described. In the following description, a display device according to an embodiment of the present invention is explained. First of all, no limitation is put on a display device described in this disclosure as long as the display device can receive and display information on a display of the mobile terminal 100 by being connected to the mobile terminal 100 for communications in-between. For example, the display device can include, but is not limited to, one of a notebook computer (laptop), a tablet computer, a desktop computer, a television set (e.g., a digital TV set, a smart TV set, etc.) and the like.

Figure 2:
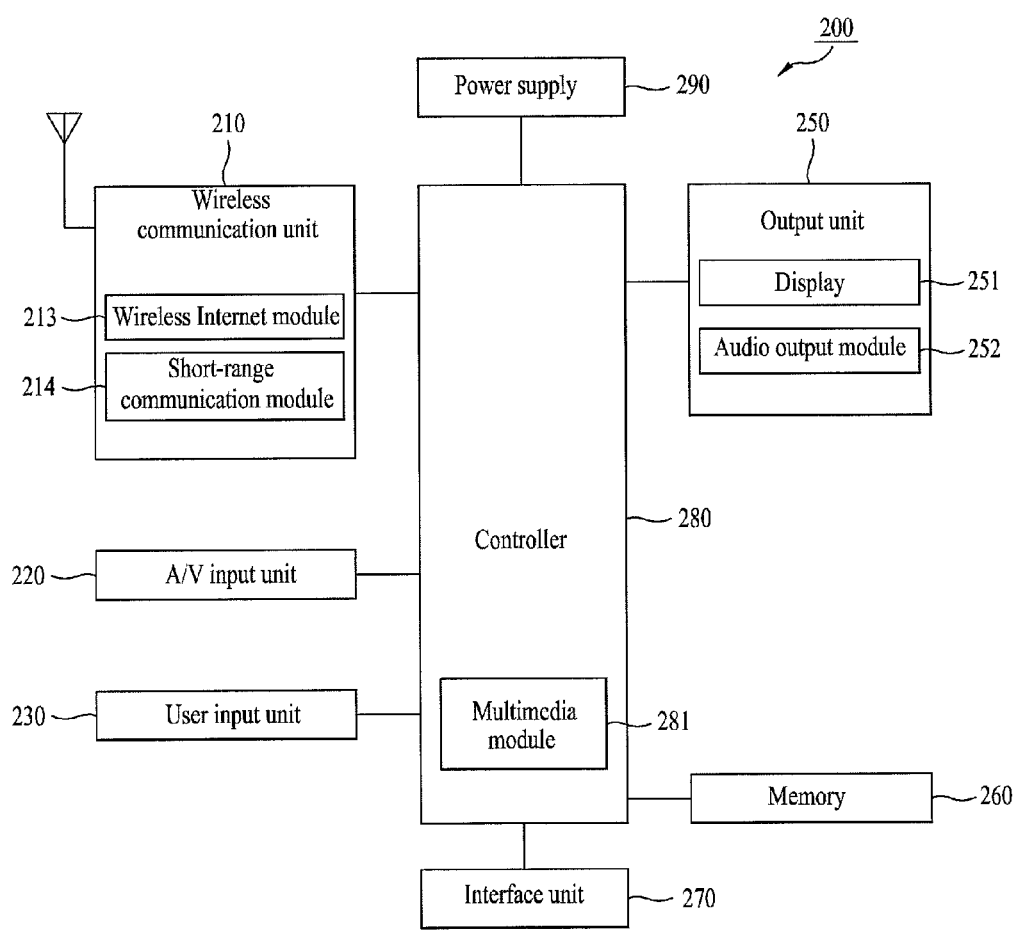
FIG. 2 is a block diagram of a display device according to one embodiment of the present invention.

FIG. 2 is a block diagram of a display device 200 according to one embodiment of the present invention. Referring to FIG. 2, the display device 200 according to one embodiment of the present invention includes a wireless communication unit 210, an A/V (audio/video) input unit 220, a user input unit 230, an output unit 250, a memory 260, an interface unit 270, a controller 280, a power supply unit 290 and the like.

The wireless communication unit 210 can include a wireless internet module 213 and a short-range communication module 214. The output unit 250 can include a display unit 251 and an audio output module 253.

Because the components of the display device 200 are identical or mostly similar to the corresponding components of the above-described mobile terminal, their details are omitted from the following description for clarity of this disclosure.

Because the components shown in FIG. 2 are not entirely mandatory, more or less components can be implemented for the display device 200. For instance, when the display device 200 is a television, it can further include a broadcast receiving module. Moreover, when the display device 200 is the television, it may not be provided with the wireless internet module. Of course, the display device 200 can include the wireless internet module. Because the broadcast receiving module is identical or mostly similar to the former broadcast receiving module 111 of the mobile terminal 100 described with reference to FIG. 1, its details are omitted from the following description for clarity of this disclosure.

In the following description, how to connect the mobile terminal 100 and the display device 200 together is explained with reference to FIG. 3.

Figure 3:
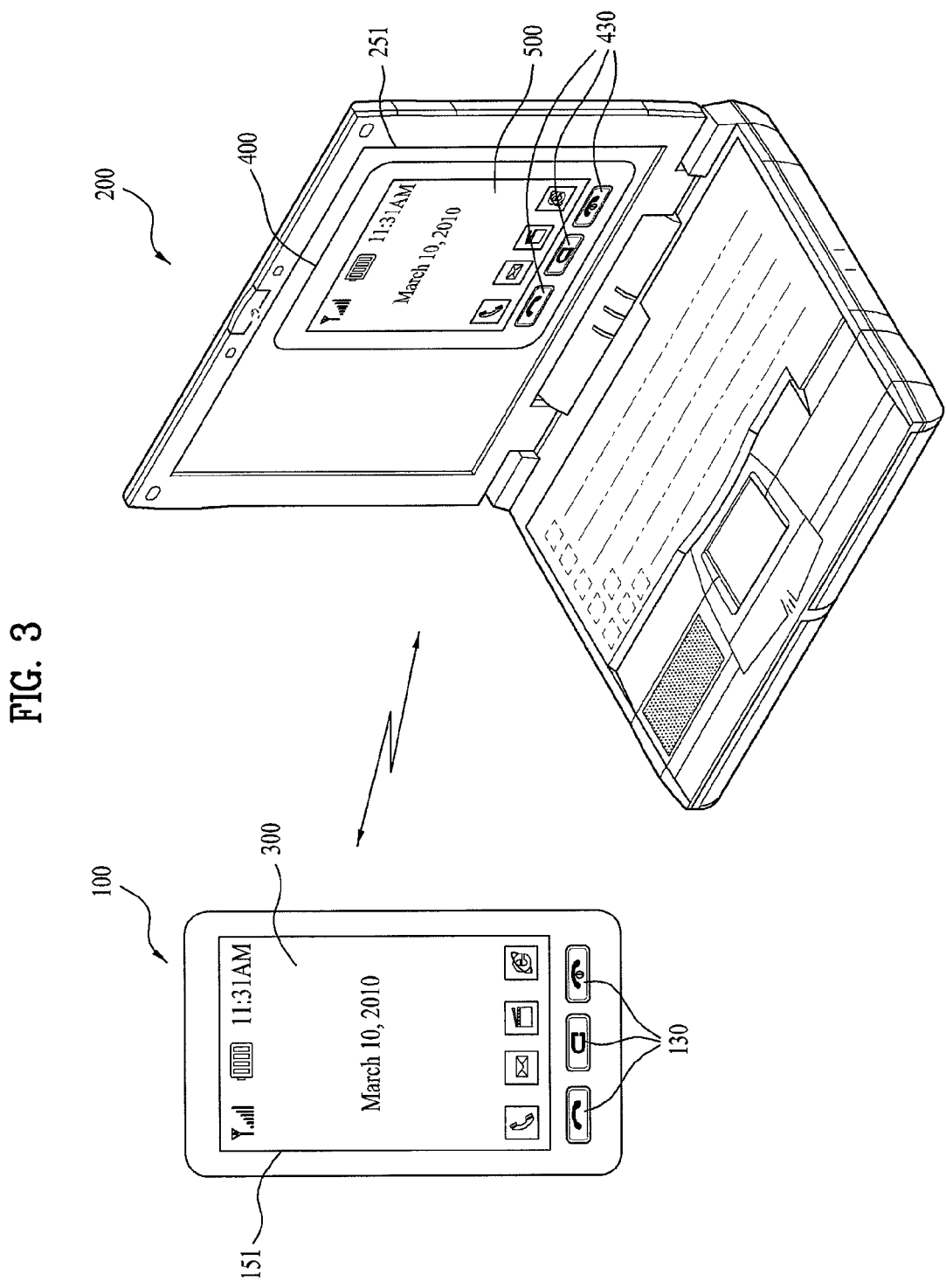
FIG. 3 is a diagram of a mobile terminal and a display device connected to each other to implement an embodiment of the present invention.

FIG. 3 is a diagram of a mobile terminal and a display device connected to each other to implement an embodiment of the present invention. Referring to FIG. 3, the mobile terminal 100 and the display device 200 can be connected to each other via the interface unit 170 of the mobile terminal 100 and the interface unit 270 of the display device 200. The connection between the mobile terminal 100 and the display device 200 can be established by wire communication or wireless communication (e.g., short-range communication, wireless internet communication, etc.).

FIG. 3 shows a state in which the mobile terminal 100 and the display device 200 are connected to each other. For clarity and convenience of the following description, in order to respectively identify the components of the mobile terminal 100 and the display device 200, 'first' is prefixed to a corresponding one of the components of the mobile terminal 100, while 'second' is prefixed to a corresponding one of the components of the display device 200.

For instance, the display unit 151 of the mobile terminal 100 is named a first display unit 151, the controller 180 of the mobile terminal 100 is named a first controller 180, the display unit 251 of the display device 200 is named a second display unit 251, and the controller 280 of the display device 200 is named a second controller 280. In addition, an image displayed on the first display unit 151 is named a first screen image 300.

Once the connection between the mobile terminal 100 and the display device 200 is established, the mobile terminal 100 can provide information on a first screen image 300 displayed on the first display unit 151 to the display device 200. In this instance, an application (e.g., a plug-in software, etc.) for processing the information on the first screen image 300 received from the mobile terminal 100 can be installed at the display device 200 in advance.

Hence, when the mobile terminal 100 and the display device 200 are connected to each other, the second controller 280 of the display device 200 can control a monitor window 400 for a first screen image 300 to be displayed on the second display unit 251. The second controller 280 of the display device 200 then controls an image corresponding to the first screen image 300 to be displayed on the monitor window 400. For clarity of the following description, in order to be discriminated from the first screen image 300 displayed in the mobile terminal 100, the image displayed on the monitor window 400 is named a second screen image 500.

In particular, the monitor window 400 can have a shape identical or similar to one face of a housing to which the first display unit 151 of the mobile terminal 100 is attached. Therefore, in case that prescribed key buttons 130 are provided to the face of the housing, soft key buttons 430 having the same shapes of the prescribed key buttons can be formed at the corresponding locations, respectively.

If the soft key button 430 is clicked by a mouse in the display device 200 (or the soft key button 430 is touched when the second display unit 251 includes a touchscreen), the second controller 280 of the display device 200 can send a control signal, which indicates that the soft key button 430 has been manipulated in the display device 200, to the mobile terminal 100.

If so, the first controller 180 of the mobile terminal 100 receives the control signal and can then control a specific function corresponding to the manipulation of the prescribed key button 130 matching the manipulated soft key button 430 to be executed in the mobile terminal 100. And, the first controller 180 of the mobile terminal 100 can control an image according to the executed specific function to be displayed as the first screen image 300 on the first display unit 151. Subsequently, the first controller 180 of the mobile terminal 100 can send information on the first screen image 300, which includes the image according to the executed specific function, to the display device 200.

If so, the second controller 280 of the display device 200 controls the second screen image 500 corresponding to the received first screen image 300 to be displayed on the monitor window 400. Therefore, a user can indirectly manipulate the mobile terminal 100 by manipulating the monitor window 400 of the display device 200 instead of directly manipulating the mobile terminal 100. And, the user can recognize the first screen image 300 of the mobile terminal 100 by viewing the second screen image 500 of the display device 200.

It is not mandatory for the monitor window 400 to have a shape identical or similar to one face of the housing having the first display unit 151 of the mobile terminal 100 loaded thereon. For instance, other icons (e.g., a window close icon, a window minimize icon, a window maximize icon, etc.) (Not shown in the drawing) can be further shown in the monitor window 400 in addition to one face of the housing. Alternatively, the second screen image 500 can be displayed on the monitor window 400 without the shape of the housing face.

Further, the display device 200 receives information on the first screen image 300 from the mobile terminal 100 and then displays the received information as the second screen image 500 on the monitor window 400. Therefore, the first screen image 300 and the second screen image 500 can share a content image generated from the mobile terminal 100 with each other.

FIG. 3 exemplarily shows that the content image generated from the mobile terminal 100 is a standby image, by which the present embodiment is non-limited. The content image generated from the mobile terminal 100 includes an image related to every function, menu or application executed in the mobile terminal 100.

In the following description, how the mobile terminal 100 provides the information on the first screen image 300 to the display device 200 is explained in detail.

First of all, the first controller 180 of the mobile terminal 100 captures the first screen image 300 displayed on the first display unit 151 and transmits the captured first screen image 300 as the aforesaid information on the first screen 300 to the display device 200. Afterwards, the second controller 280 of the display device 200 receives the captured first screen image 300 and then controls the received first screen image 300 to be displayed as the second screen image 500 on the monitor window 400.

In doing so, the first screen image 300 and the second screen image 500 can depend on each other when zooming in or zooming out, for example. In particular, if the first screen image 300 zooms in or out, the second screen image 500 can zoom in or out correspondingly. Moreover, contents of the first and second screen images 300 and 500 can become dependent on each other.

Otherwise, the first controller 180 of the mobile terminal 100 can transmit a video signal input to the first display unit 151 to the display device 200 as the information on the first screen image 300. The first display unit 151 of the mobile terminal 100 can then output the video signal as the first screen image 300. Meanwhile, the second controller 280 of the display unit 200 receives the transmitted video signal and outputs the received video signal as the second screen image 500 to the monitor window 400 of the second display unit 251. In particular, the first display unit 151 and the second display unit 251 can share the video signal output from the first controller 180 with each other. In the following description, the video signal is named a shared video signal.

In this instance, the first screen image 300 and the second screen image 500 can also depend on each other when zooming in or zooming out, for example. In particular, if the first screen image 300 zooms in or out, the second screen image 500 can zoom in or out correspondingly. Moreover, contents of the first and second screen images 300 and 500 can also become dependent on each other.

Further, the first controller 180 of the mobile terminal 100 generates a first video signal and a second video signal independent from the first video signal, both first and second video signals relating to a specific content image generated from the mobile terminal 100. The first controller 180 can input the first video signal to the first display unit 151 and transmits the second video signal as the information on the first screen image 300 to the display device 200. The first display unit 151 of the mobile terminal 100 then outputs the first video signal as the first screen image 300.

Meanwhile, the second controller 280 of the display device 200 receives the transmitted second video signal and outputs the received second video signal as the second screen image 500 on the monitor window 400 of the second display unit 251. It should be noted that each of the first and second video signals should be discriminated from the shared video signal in that the first video signal and the second video signal are independently provided to the first display unit 151 and the second display unit 251, respectively.

In this instance, the first screen image 300 and the second screen image 500 can become independent from each other when zooming in and zooming out, for example. In particular, the second screen image 500 can zoom in or out irrespective of the zoom adjustment of the first screen image 300. Moreover, the first screen image 300 and the second screen image 500 can become independent from each other in their contents. The zoom-in and zoom-out features of each of the first screen image 300 and the second screen image 500 are described again later.

In the above description, as the mobile terminal 100 and the display device 200 are connected to each other, the first screen image 300 displayed on the first display unit 151 and the monitor window 400 and the second screen image 500 displayed on the second display unit 251 are schematically explained.

In the following description, the first screen image 300, the monitor window 400 and the second screen image 500 are explained in more detail with reference to FIGS. 4 to 10. In the following description, both of the first display unit 151 of the mobile terminal 100 and the second display unit 251 of the display device 200 can include touchscreens, respectively. Yet, the embodiment of the present invention is applied not only to the first and second display units 151 and 251 including the touchscreens, but also to the first and second display units 151 and 251 including normal displays.

Figure 4:
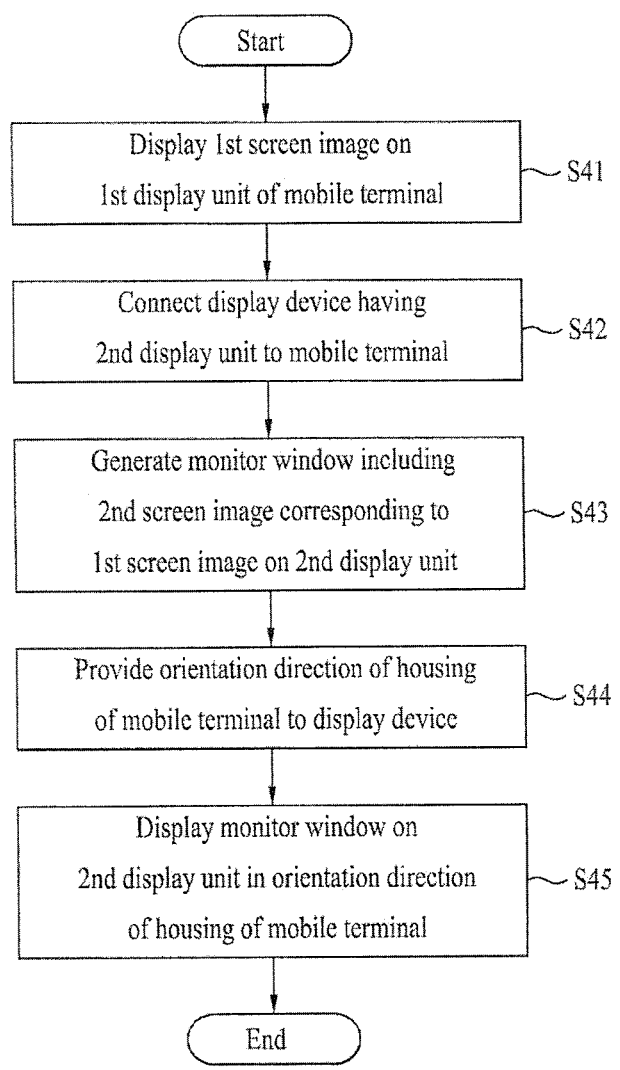
FIG. 4 is a flowchart according to an embodiment of the present invention.

FIG. 4 is a flowchart according to an embodiment of the present invention. Referring to FIG. 4, the first screen image 300 is displayed on the first display unit 151 of the mobile terminal 100 (S41), and the mobile terminal 100 is connected to the display device 200 (S42). Alternatively, the steps S41 and S42 can be performed in reverse order or at the same time. Details of the steps S41 and S42 are omitted from the following description for clarity, because the steps S41 and S42 were described with reference to FIG. 3.

As the mobile terminal 100 and the display device 200 are connected to each other, the monitor window 400 is generated on the second display unit 251 of the display device 200. Further, the second screen image 500 corresponding to the first screen image 300 is displayed on the monitor window 400 (S43).

How the monitor window 400 is generated on the second display unit 251 is explained in detail with reference to FIG. 5 as follows. Referring to FIG. 5, at least one of objects A, B, C . . . can be displayed on the second display unit 251 of the display device 200 in advance. In this instance, 'object' means a graphic interface prepared for interaction with a user and can include at least one of a menu icon, a file icon, an execute icon, a thumbnail, a link, a text input box and the like. In FIG. 5, it is assumed that the object includes an icon or the like.

Referring to FIG. 5 (5-1), when the mobile terminal 100 and the display device 200 are connected to each other, the second controller 280 of the display device 200 can control a generated position of the monitor window 400 to be determined by having no consideration of the objects previously displayed on the second display unit 251 of the display device 200. In particular, the monitor window 400 can be generated to block the objects in order to be displayed at a specific position.

Referring to FIG. 5 (5-2), when the mobile terminal 100 and the display device 200 are connected to each other, the second controller 280 of the display device 200 can control a generated position of the monitor window 400 to be determined in consideration of the objects previously displayed on the second display unit 251 of the display device 200. In particular, the monitor window 400 can be generated at an appropriate position to avoid blocking the objects.

Moreover, referring to FIG. 5 (5-3), the second controller 280 of the display device 200 can control a generated position and size of the monitor window 400 to be determined in consideration of the objects previously displayed on the second display unit 251. In particular, the monitor window 400 can be generated with an appropriate size at an appropriate position to avoid blocking the objects. Of course, the position and size of the generated monitor window 400 can be adjusted by a user's manipulation.

The first screen image 300 and the second screen image 500 are described in detail with reference to FIG. 6 as follows. Referring to FIG. 6 (6-1), at least one of objects 301, 303, 305 and 307 for the content image can be displayed on the first screen image 300. For clarity of the following description, the object in the first screen image 300 is named a first object.

Further, objects 501, 503, 505 and 507 respectively corresponding to the first objects 301, 303, 305 and 307 can be displayed on the second screen image 500. For clarity of the following description, the object in the second screen image 500 is named a second object.

The first specific object 303 for execution of a message menu can be selected from the first screen image 300 of the mobile terminal 100, for example. When the first display unit 151 of the mobile terminal 100 includes a touchscreen, the first specific object 303 can be selected by being touched. If so, the first controller 180 of the mobile terminal 100 controls the message menu to be executed based on the selection of the first specific object 303.

Alternatively, when the specific second object 503 corresponding to the first specific object 303 is selected from the second screen image 500 of the display device 200, the second controller 280 of the display device 200 transmits a control signal to the mobile terminal 100 to indicate that the specific second object 503 has been selected. In this instance, the selection of the specific second object 503 can be performed by clicking a mouse. Alternatively, if the second display unit 251 includes a touchscreen, the selection of the specific second object 503 can be performed by touching the specific second object 503. The second controller 280 of the display device 200 can then transmit a control signal to the mobile terminal to indicate a mouse-click position or touch position on the monitor. If so, the first controller 180 of the mobile terminal 100 controls the message menu to be executed based on the control signal.

Once the message menu is executed in the mobile terminal 100, referring to FIG. 6 (6-2), the first controller 180 of the mobile terminal 100 controls a content image according to the executed message menu to be displayed as the first screen image 300 on the first display unit 151, and controls the content image according to the executed message menu to be displayed as the second screen image 500 on the monitor window 400 of the second display unit 251.

In the following description, an orientation direction of the monitor window 400 within the second display unit 251 according to an orientation direction of a housing of the mobile terminal 100 and display directions of first and second screen images 300 and 500 according to the orientation direction are described in detail with reference to FIGS. 7 and 8.

As mentioned in the foregoing description with reference to FIG. 6, the following situation is assumed. First of all, the housing of the mobile terminal 100 is positioned in a vertical direction. Secondly, the monitor window 400 is positioned in the vertical direction on the second display unit 251. Thirdly, a display direction of the first screen image 300 of the first display unit 151 is a portrait direction. Fourthly, a display direction of the second screen image 500 of the second display unit 251 is the portrait direction.

Figure 7:
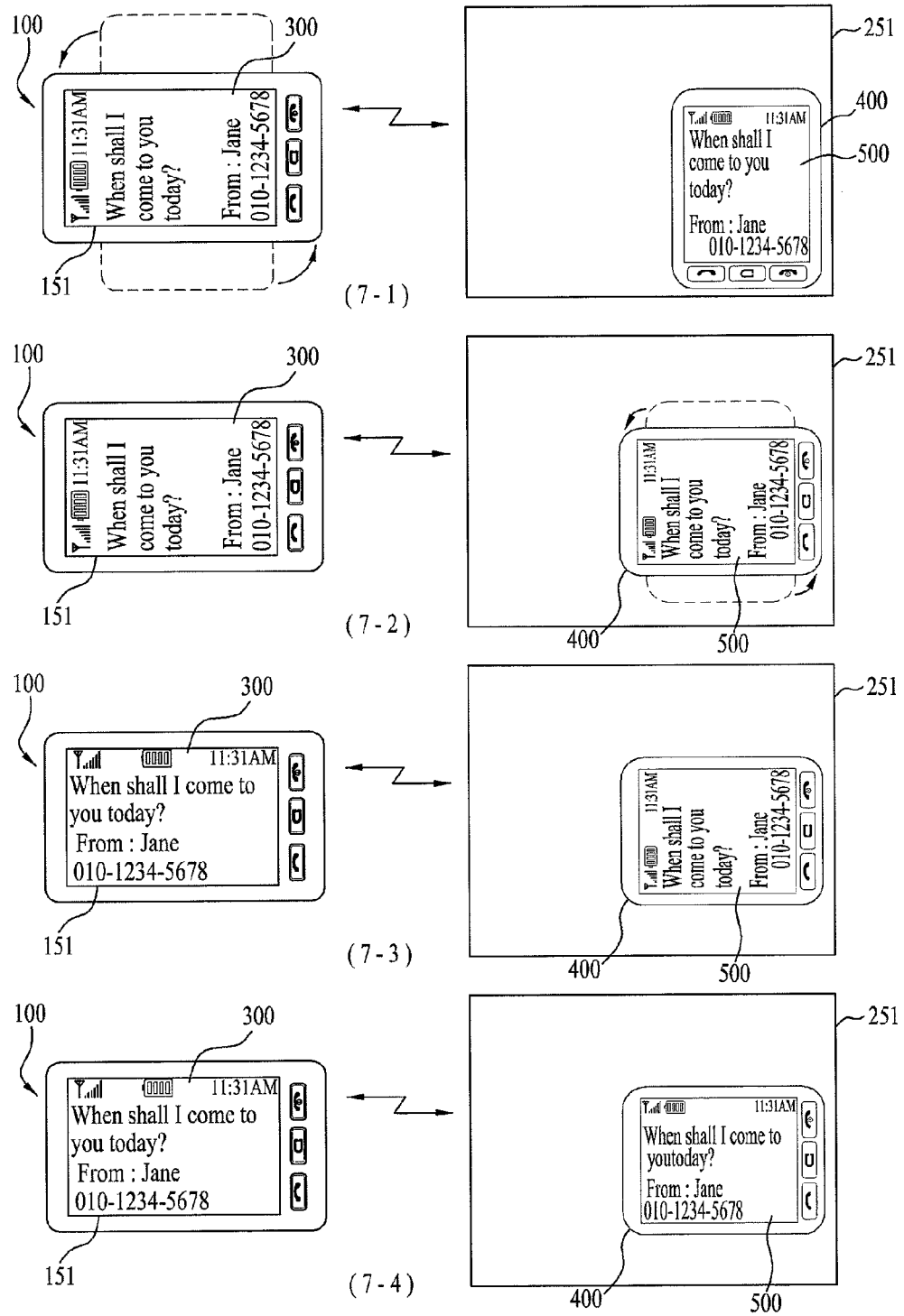

Referring to FIG. 7 (7-1), an orientation direction of the housing of the mobile terminal 100 can be changed when a user arranges the housing of the mobile terminal 100 in a horizontal direction by turning the housing of the mobile terminal 100 counterclockwise. If so, the first controller 180 of the mobile terminal 100 can detect the changed orientation direction via the first sensing unit 140. The first controller 180 of the mobile terminal 100 can then provide the detected changed orientation direction to the display device 200 (S44).

Subsequently, referring to FIG. 7 (7-2), the second controller 280 of the display device 200 controls the monitor window 400 to be arranged in a horizontal direction by turning the monitor window 400 counterclockwise according to the changed orientation direction (S45).

Meanwhile, referring to FIG. 7 (7-3), the first controller 180 of the mobile terminal 100 controls the first screen image 300 in the first display unit 151 to be displayed in a landscape direction based on the changed orientation direction. The first controller 180 of the mobile terminal 100 can then provide the display device 200 with information on the first screen image 300 according to the landscape direction.

If so, referring to FIG. 7 (7-4), the second controller 280 of the display device 200 controls the second screen image 500 in the monitor window 400 arranged in the horizontal direction to be displayed in the landscape direction. When the orientation direction of the monitor window 400 is changed in the second display unit 251, a size of the monitor window 400 can be adjusted in consideration of objects existing as a neighbor to the monitor window 400. This is further explained with reference to FIG. 8 as follows.

Figure 8:
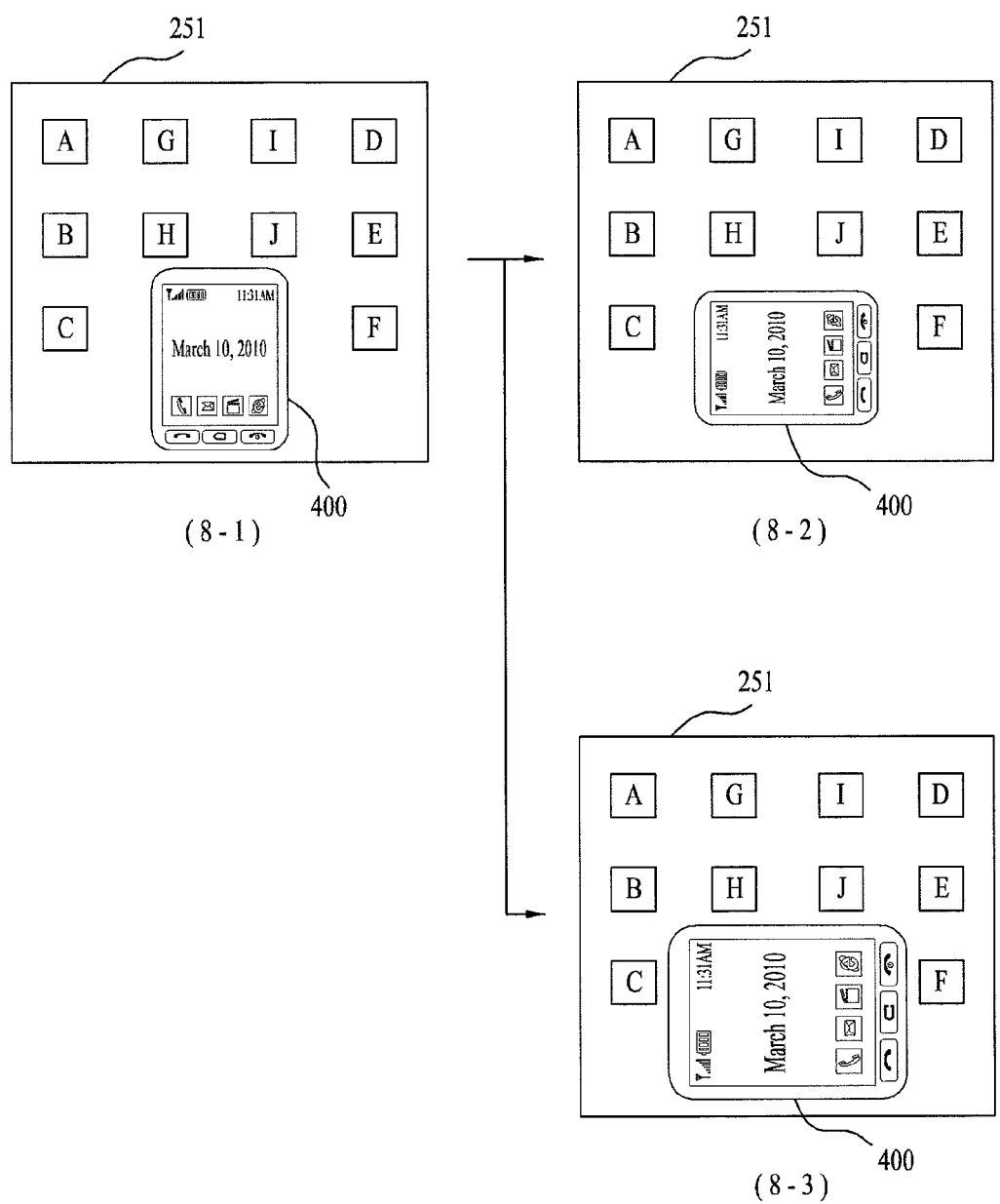
FIG. 8 is a diagram of a screen of a display unit of a display device according to an embodiment of the present invention.

Referring to FIG. 8 (8-1), the monitor window 400 is oriented in the vertical direction on the second display 251 of the display device 200. In this instance, the monitor window 400 is displayed in a first size in consideration of the objects A, B, C . . . arranged around the monitor window 400. In particular, the first size can include a maximum size enough not to block the objects neighbor to the monitor window 400 when the monitor window 40 is arranged in the vertical direction.

As mentioned in the foregoing description, as the orientation direction of the housing of the mobile terminal 100 is changed, the orientation direction of the monitor window 400 can be changed into the horizontal direction. In doing so, referring to FIG. 8 (8-2), unless the monitor window 400 blocks the neighbor objects, the second controller 280 of the display device 200 can control the size of the monitor window 400 changed in the horizontal direction to be maintained intact in the first size.

Alternatively, referring to FIG. 8 (8-3), when the monitor window 400 is arranged in the horizontal direction, the second controller 280 of the display device 200 can enlarge the monitor window 400 into a second size, which is a maximum size large enough not to block the neighbor objects, in consideration of the arrangement of the neighbor objects.

In the description with reference to FIG. 7, the orientation direction of the monitor window 400 is changed according to the orientation direction of the housing of the mobile terminal 100. However, it is not mandatory for the orientation direction of the monitor window 400 in the display unit 251 to be determined by the orientation direction of the housing of the mobile terminal 100. This is further described with reference to FIG. 9 as follows.

As mentioned in the foregoing description with reference to FIG. 7 (7-4), the following situation is assumed. First of all, the housing of the mobile terminal 100 is positioned in a horizontal direction. Secondly, the monitor window 400 is positioned in the horizontal direction on the second display unit 251. Thirdly, a display direction of the first screen image 300 of the first display unit 151 is a landscape direction. Fourthly, a display direction of the second screen image 500 of the second display unit 251 is the landscape direction.

Referring to FIG. 9 (9-1), when a prescribed user command is input to the display device 200, the second controller 280 of the display device 200 can control the monitor window 400 to be oriented in the vertical direction by being turned clockwise. FIG. 9 (9-1) shows that the second display 251 of the display device 200 includes a touchscreen. In particular, referring to FIG. 9 (9-1), after two positions on the monitor window 400 have been simultaneously touched, if the touch is rotated clockwise, the monitor window 400 is turned clockwise as well. Further, no limitation is put on the prescribed user command input to the display device 200 for the rotation of the monitor window 400.

Once the monitor window 400 is oriented in the vertical direction, the second controller 280 of the display device 200 transmits a control signal to the mobile terminal 100 to indicate that the monitor window 400 has been oriented in the vertical direction. If so, referring to FIG. 9 (9-2), the first controller 180 of the mobile terminal 100 controls the display direction of the first screen image 300 to be changed into the portrait direction despite that the housing of the mobile terminal 100 keeps being oriented in the horizontal direction.

In addition, the first controller 180 of the mobile terminal 100 can control information on the first screen image 300 changed into the portrait direction to be transmitted to the display device 200. Subsequently, the second controller 280 of the display device 200 receives the information on the first screen image 300, and controls the second screen image 500 to be displayed in the portrait direction.

Referring to FIG. 9 (9-3), a user can orient the housing of the mobile terminal 100 in the vertical direction again by turning the housing of the mobile terminal 100 clockwise. Yet, because the first screen image 300 of the mobile terminal 100 is already displayed in the portrait direction, the display direction of the first screen image 300 may not be changed. Moreover, because the first controller 180 of the mobile terminal 100 determines that the monitor window 400 has already been oriented in the vertical direction via the former control signal, a control signal may not be transmitted to the display device 200 to indicate that the housing of the mobile terminal 100 is oriented in the vertical direction again. Even if the latter control signal is transmitted to the display device 200 to indicate that the housing of the mobile terminal 100 is oriented in the vertical direction again, the second controller 280 of the display device 200 can ignore the corresponding control signal because the monitor window 400 is already oriented in the vertical direction.

If the first controller 180 of the mobile terminal 100 captures the first screen image 300 and then transmits the captured first screen image 300 as information on the first screen image 300 to the display device 200 or if the first controller 180 of the mobile terminal 100 transmits the share video signal input to the first display unit 151 to the display device 200, referring to FIG. 9, a display direction of the first screen image 300 is equal to that of the second screen image 500.

Yet, if the first controller 180 of the mobile terminal 100 generates a first video signal and a second video signal independent from the first video signal and then transmits the first video signal and the second signal to the first display unit 151 and the display device 200, respectively, a display direction of the first screen image 300 can be independent from that of the second screen image 500. This is described in detail with reference to FIG. 10 as follows.

As mentioned in the foregoing description with reference to FIG. 9 (9-1), when a prescribed user command is input to the display device 200, the second controller 280 of the display device 200 can control the monitor window 400 to be oriented in the vertical direction by being turned clockwise. Once the monitor window 400 is oriented in the vertical direction, the second controller 280 of the display device 200 can transmit a control signal to the mobile terminal 100 to indicate that the monitor window 400 has been oriented in the vertical direction.

Subsequently, the first controller 180 of the mobile terminal 100 transmits a second video signal of a portrait direction corresponding to the monitor window 400 of the vertical direction to the display device 200. If so, referring to FIG. 10 (10-1), the second controller 280 of the display device 200 controls the second screen image 500 to be displayed in the portrait direction according to the second video signal.

And, the first controller 180 of the mobile terminal 100 can keep providing the first video signal in a landscape direction independent from the second video signal, which corresponds to the housing of the mobile terminal 100 oriented in the horizontal direction, to the first display unit 151. Therefore, referring to FIG. 10 (10-1), the first screen image 300 can keep being displayed on the first display unit 151 in the landscape direction.

Referring to FIG. 10 (10-2), a user can orient the housing of the mobile terminal 100 in the vertical direction again. If so, the first controller 180 of the mobile terminal 100 can control the first video signal, which enables the first screen image 300 to be displayed in the portrait direction to correspond to the housing of the mobile terminal 100 oriented in the vertical direction, to be provided to the first display unit 151. And, the first controller 180 of the mobile terminal 100 keeps transmitting the second video signal corresponding to the monitor window 400 of the vertical direction to the display device 200, thereby controlling the second screen image 500 to keep being displayed in the portrait direction on the second display unit 251.

In the above description, the display directions of the first and second screen images 300 and 500 and the orientation direction of the monitor window 400 due to the orientation direction of the housing of the mobile terminal 100 are explained. Zoom-in and zoom-out features of each of the first and second screen images 300 and 500 and enlargement and reduction of the monitor window 400 will now be explained with reference to FIGS. 11 and 12.

Figure 11:
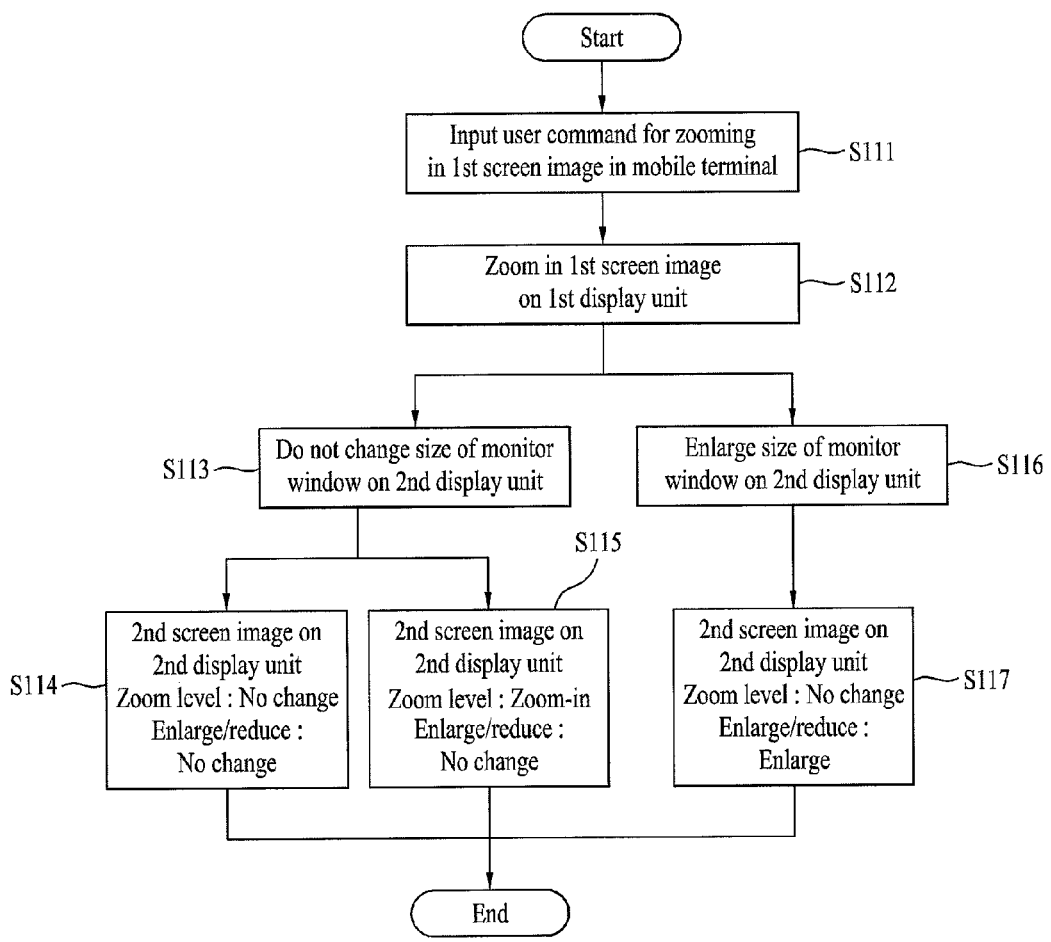
FIG. 11 is a flowchart according to an embodiment of the present invention.
Figure 12:
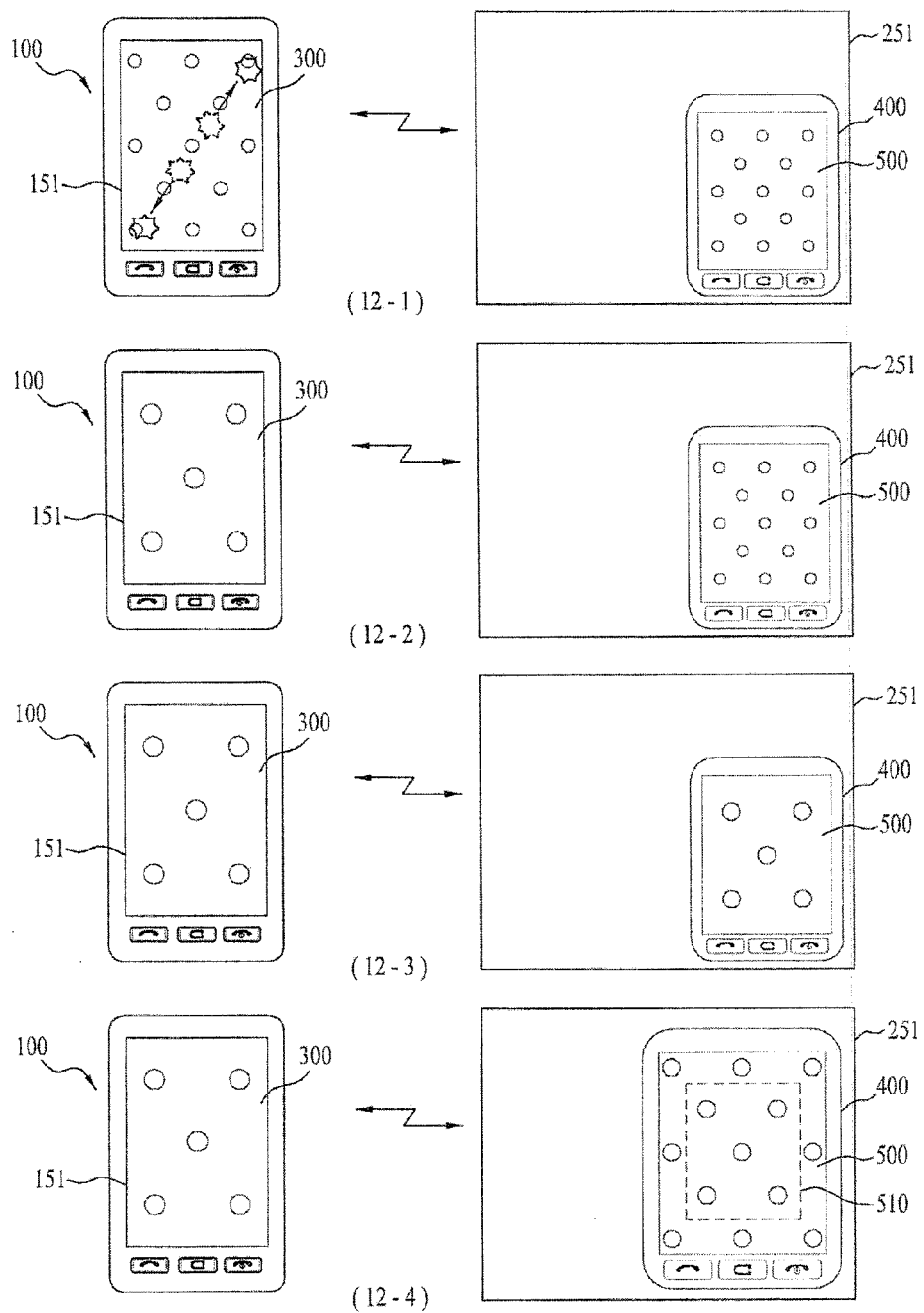
FIG. 12 is a diagram of a front side of a mobile terminal and a display unit of a display device according to an embodiment of the present invention.

In particular, FIG. 11 is a flowchart according to an embodiment of the present invention, and FIG. 12 is a diagram of a front side of the mobile terminal 100 and a display unit of the display device 200 according to an embodiment of the present invention. Referring to FIG. 12 (12-1), the first screen image 300 is displayed on the first display 151 of the mobile terminal 100, the monitor window 400 is displayed on the second display 251 of the display device 200, and the second screen image 500 is displayed on the monitor window 400.

In doing so, a user command for zooming in the first screen image 300 on the mobile terminal 100 can be input (S111). For instance, the user command for the zoom-in feature can be input by performing two touches on two positions on the first display unit (e.g., a touchscreen) 151 simultaneously and dragging the touches in a pinching-out direction. Alternatively, the user command for the zoom-in feature can be input via a user manipulation performed on the first user input unit 130.

Subsequently, referring to FIG. 12 (12-2), the first controller 180 of the mobile terminal 100 controls the first screen image 300 to be zoomed in (S112). The first controller 180 of the mobile terminal 100 then transmits a second video signal independent from a first video signal for the zoomed-in first screen image 300 to the display device 200. In this instance, the second video signal can include information on the original first screen image 300 before the zoom-in.

If so, the second controller 280 of the display device 200 can control a size of the monitor window 400 to be maintained intact (S113). The second controller 280 of the display device 200 can then control a zoom level of the second screen image 500 to be maintained intact by maintaining a size of the second screen image 500 as it is (S114). Alternatively, referring to FIG. 12 (12-3), while the first controller 180 of the mobile terminal 100 controls the first screen image 300 to be zoomed in (S112), the first controller 180 of the mobile terminal 100 can provide information on the zoomed-in first screen image 300 to the display device 200. In this instance, the information on the zoomed-in first screen image 300 can include a captured image of the first screen image 300 or the share video signal input to the first display unit 151.

If so, the second controller 280 of the display device 200 can control the size of the monitor window 400 to be maintained intact (S113), and control the second screen image 500 to be zoomed in by maintaining the size of the second screen image 500 (S115). Alternatively, referring to FIG. 12 (12-4), the first controller 180 of the mobile terminal 100 can control the first screen image 300 to be zoomed in (S112). And, the first controller 180 of the mobile terminal 100 can provide a control signal to the display device 200 to indicate that the first screen image 300 has been zoomed in.

The second controller 280 of the display device 200 can also increase the size of the monitor window 400 in proportion to a level of the zoom-in according to the control signal (S116). Subsequently, the first controller 180 of the mobile terminal 100 can transmit a second video signal independent from the first video signal for the zoomed-in first screen image 300 to the display device 200. In this instance, the second video signal can include the original first screen image 300 before the zoom-in.

If so, the second controller 280 of the display device 200 can control a zoom level of the second screen image 500 to be maintained intact while the second screen image 500 is enlarged and displayed on the enlarged monitor window (S117). In particular, a rectangular part 510 represented as a dotted line within the second screen image 500 shown in FIG. 12 (12-4) can correspond to the entire second screen image 500 shown in FIG. 12 (12-3). Besides, it is not mandatory for the rectangular part 510 represented as the dotted line to be displayed in FIG. 12 (12-4).

In this disclosure, the concept of 'zoom-in' of an image is discriminated from the concept of 'enlargement' of an image. In particular, if a range of a content of an image displayed within a boundary of the image is decreased irrespective of whether the boundary of the image is enlarged or reduced, the image is 'zoomed in'. On the contrary, irrespective of a change of a zoom level of an image, if a boundary of the image is enlarged, the image is 'enlarged'.

For instance, if the second screen image 500 shown in FIG. 12 (12-1) is changed into the second screen image 500 shown in FIG. 12 (12-3), the second screen image 500 is not 'enlarged' but 'zoomed in'. In another instance, if the second screen image 500 shown in FIG. 12 (12-1) is changed into the second screen image 500 shown in FIG. 12 (12-4), the second screen image 500 is not 'zoomed in' but 'enlarged'.

Figure 13:
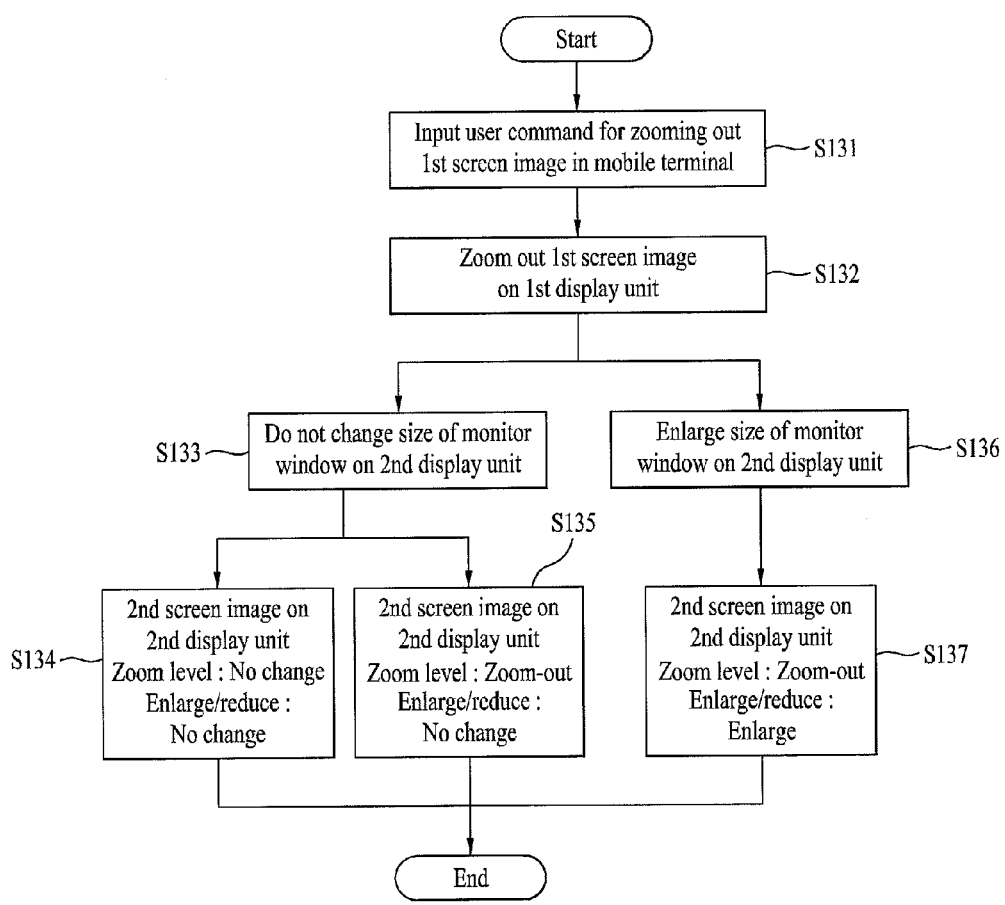
FIG. 13 is a flowchart according to an embodiment of the present invention.
Figure 14:
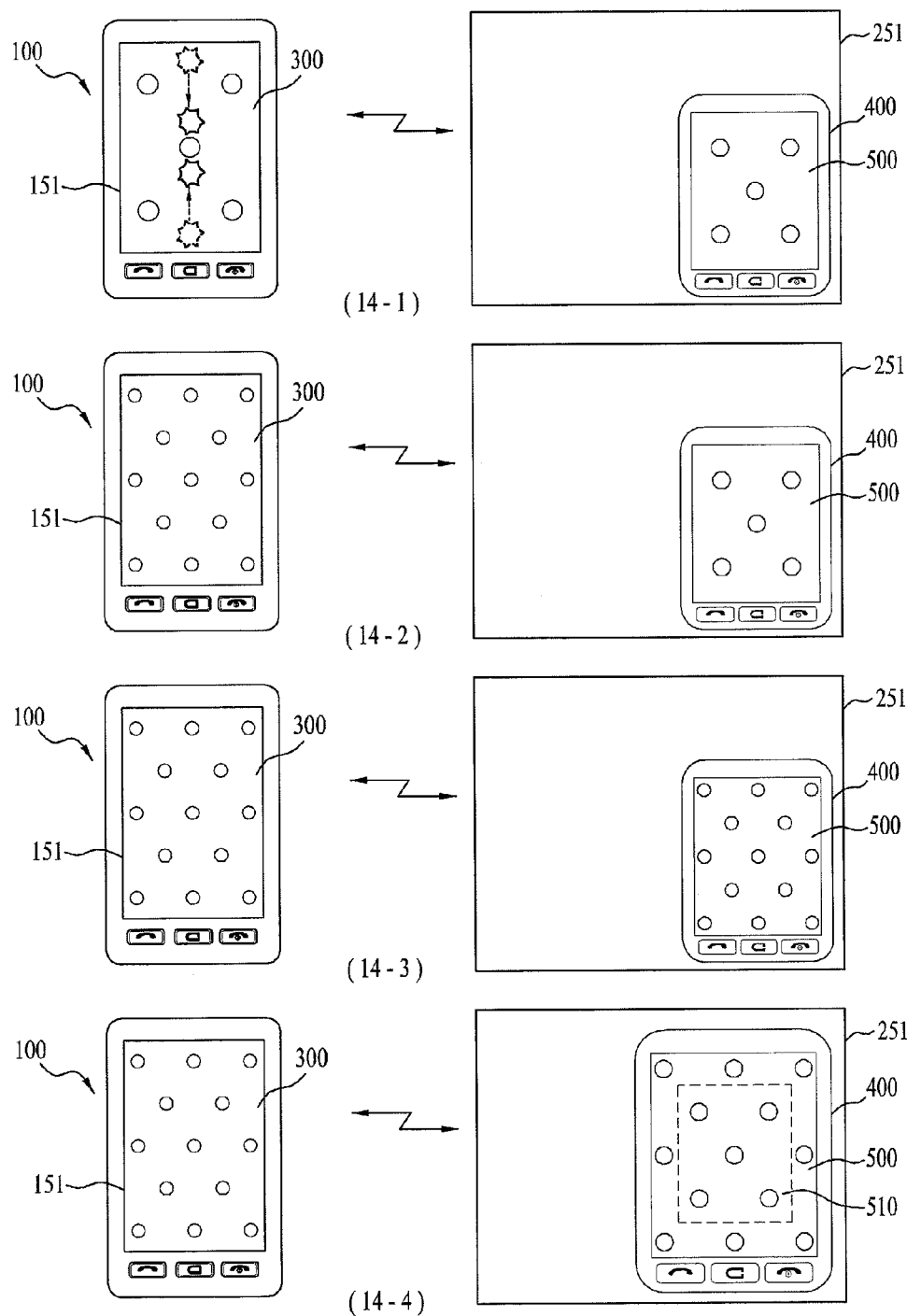
FIG. 14 is a diagram of a front side of a mobile terminal and a display unit of a display device according to an embodiment of the present invention.

The following description is made with reference to FIGS. 13 and 14. In particular, FIG. 13 is a flowchart according to an embodiment of the present invention, and FIG. 14 is a diagram of a front side of the mobile terminal 100 and a display unit of the display device 200 according to an embodiment of the present invention.

Referring to FIG. 14 (14-1), the first screen image 300 is displayed on the first display 151 of the mobile terminal 100, the monitor window 400 is displayed on the second display 251 of the display device 200, and the second screen image 500 is displayed on the monitor window 400.

In doing so, a user command for zooming out the first screen image 300 on the mobile terminal 100 can be input (S131). For instance, the user command for the zoom-out feature can be input by performing two touches on two positions on the first display unit (e.g., a touchscreen) 151 simultaneously and dragging the touches in a pinching-in direction. Alternatively, the user command for the zoom-out feature can be input via a user manipulation performed on the first user input unit 130.

Subsequently, referring to FIG. 14 (14-2), the first controller 180 of the mobile terminal 100 controls the first screen image 300 to be zoomed out (S132). The first controller 180 of the mobile terminal 100 then transmits a second video signal independent from a first video signal for the zoomed-out first screen image 300 to the display device 200. In this instance, the second video signal can include information on the original first screen image 300 before the zoom-out. If so, the second controller 280 of the display device 200 controls a size of the monitor window 400 to be maintained intact (S133). The second controller 280 of the display device 200 then controls a zoom level of the second screen image 500 to be maintained intact by maintaining a size of the second screen image 500 as it is (S134).

Alternatively, referring to FIG. 14 (14-3), while the first controller 180 of the mobile terminal 100 controls the first screen image 300 to be zoomed out (S132), the first controller 180 of the mobile terminal 100 can provide information on the zoomed-out first screen image 300 to the display device 200. In this instance, the information on the zoomed-out first screen image 300 can include a captured image of the first screen image 300 or the share video signal input to the first display unit 151. If so, the second controller 280 of the display device 200 can control the size of the monitor window 400 to be maintained intact (S133), and control the second screen image 500 to be zoomed out by maintaining the size of the second screen image 500 (S135).

Alternatively, referring to FIG. 14 (14-4), the first controller 180 of the mobile terminal 100 can control the first screen image 300 to be zoomed out (S132), and provide a control signal to the display device 200 to indicate that the first screen image 300 has been zoomed out.

The second controller 280 of the display device 200 can also then increase the size of the monitor window 400 in proportion to a level of the zoom-out according to the control signal (S136). Subsequently, the first controller 180 of the mobile terminal 100 can provide information on the zoomed-out first image 300 to the display device 200. In this instance, the information on the zoomed-out first screen image 300 can include a captured image of the first screen image 300 or the share video signal input to the first display unit 151.

If so, the second controller 280 of the display device 200 can control the second screen image 500 to be zoomed out while the second screen image 500 is displayed as being enlarged on the monitor window 400 (S137). In particular, the rectangular part 510 represented as a dotted line within the second screen image 500 shown in FIG. 14 (14-4) corresponds to the entire second screen image 500 shown in FIG. 14 (14-1). However, it is not mandatory for the rectangular part 510 represented as the dotted line to be displayed in FIG. 14 (12-4).

Further, the concept of 'zoom-out' of an image is discriminated from the concept of 'reduction' of an image. In particular, if a range of a content of an image displayed within a boundary is increased irrespective of whether the boundary of the image is enlarged or reduced, the image is 'zoomed out'. On the contrary, irrespective of a change of a zoom level of an image, if a boundary of the image is reduced, the image is 'reduced'.

For instance, if the second screen image 500 shown in FIG. 14 (14-1) is changed into the second screen image 500 shown in FIG. 14 (14-3), the second screen image 500 is not 'reduced' but 'zoomed out'. In another instance, if the second screen image 500 shown in FIG. 14 (14-4) is changed into the second screen image 500 shown in FIG. 14 (14-3), the second screen image 500 is not 'zoomed out' but 'reduced'. In still another instance, if the second screen image 500 shown in FIG. 14 (14-1) is changed into the second screen image 500 shown in FIG. 14 (14-4), the second screen image is enlarged as well as zoomed out.

The above description explains inputting a user command for zooming in or out the first screen image 300 in the mobile terminal 100. In the following description, zooming in (or enlarging) or zooming out (or reducing) the second screen image 500 in the display device 200 will be explained with reference to FIGS. 15 and 16.

Figure 15:
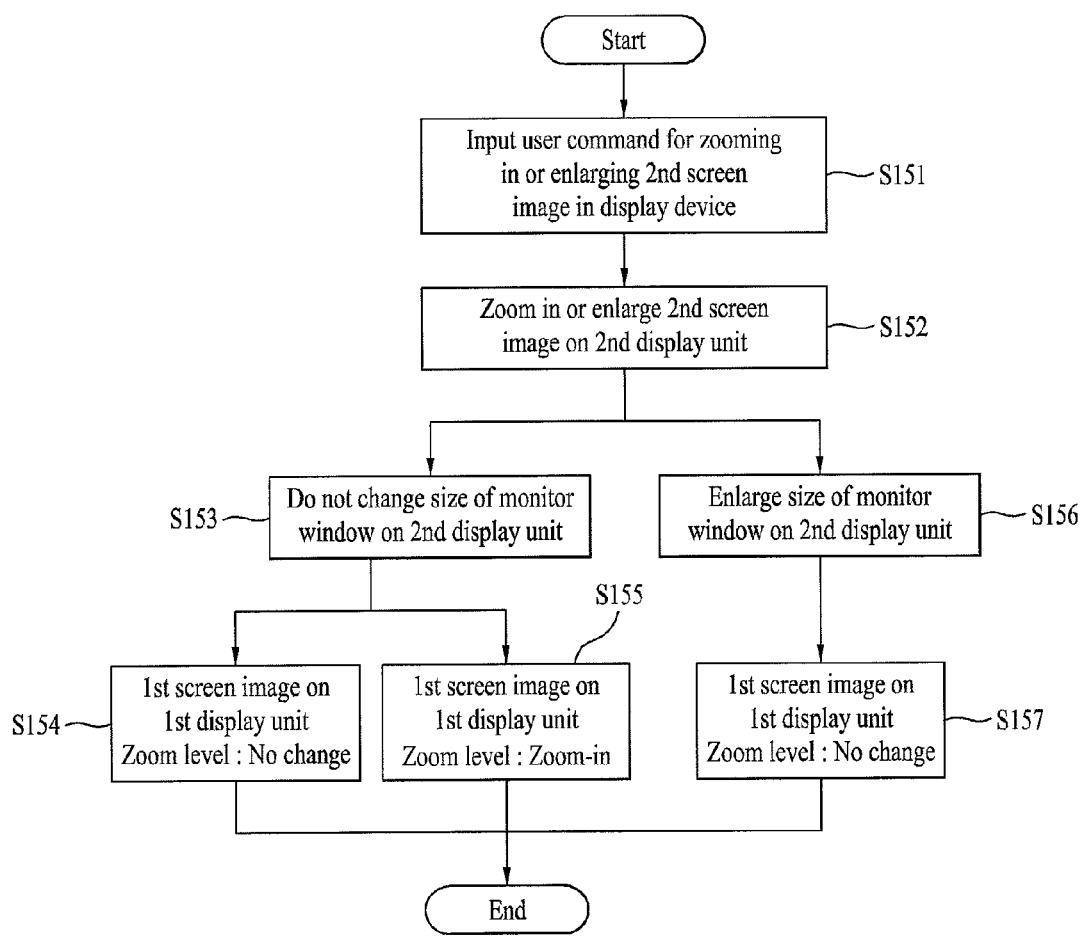
FIG. 15 is a flowchart according to an embodiment of the present invention.
Figure 16:
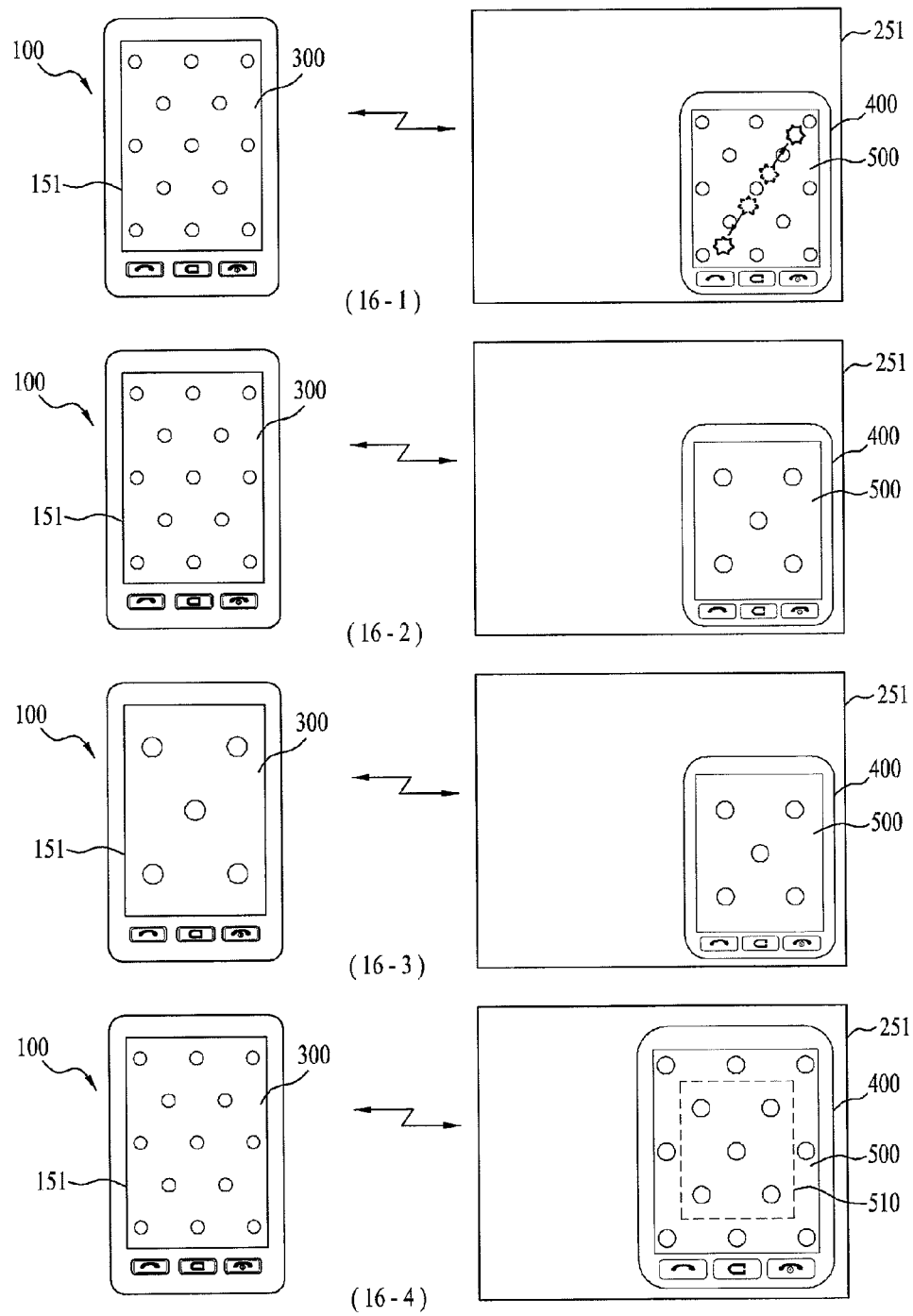
FIG. 16 is a diagram of a front side of a mobile terminal and a display unit of a display device according to an embodiment of the present invention.

In particular, FIG. 15 is a flowchart according to an embodiment of the present invention, and FIG. 16 is a diagram of a front side of the mobile terminal 100 and a display unit of the display device 200 according to an embodiment of the present invention. Referring to FIG. 16 (16-1), the first screen image 300 is displayed on the first display 151 of the mobile terminal 100, the monitor window 400 is displayed on the second display 251 of the display device 200, and the second screen image 500 is displayed on the monitor window 400.

In doing so, a user command for zooming in or enlarging the second screen image 500 in the display device 200 can be input (S151). For instance, the user command for the zoom-in or enlargement can be input by performing two touches on two positions on the second screen image 500 of the monitor window 400 of the second display unit (e.g., a touchscreen) 251 simultaneously and dragging the touches in a pinching-out direction. Alternatively, the user command for the zoom-in or enlargement can be input via a user manipulation performed on the second user input unit 230 of the display device 200.

According to whether the user command is a command for zooming in the second screen image 500 or a command for enlarging the second screen image 500, the first screen image 300 can vary more differently. This is explained in detail as follows. First of all, the user command is assumed to be the zoom-in command. If so, the second controller 280 of the display device 200 can transmit a control signal to the mobile terminal 100 to indicate that the zoom-in command of the second screen image 500 has been input. If so, the first controller 180 of the mobile terminal 100 transmits a video signal corresponding to the control signal to the display device 200.

Subsequently, referring to FIG. 16 (16-2), the second controller 280 of the display device 200 controls the second screen image 500 to be zoomed in using the video signal (S152), and controls a size of the monitor window 400 to be maintained intact (S153). Referring again to FIG. 16 (16-2), the first controller 180 of the mobile terminal 100 controls a zoom level of the first screen image 300 to be not changed in the first display unit 151 irrespective of the control signal (S154).

Then, the second controller 280 of the display device 200 transmits a control signal to the mobile terminal 100 to indicate that the zoom-in command of the second screen image 500 has been input. If so, the first controller 180 of the mobile terminal 100 transmits a video signal corresponding to the control signal to the display device 200.

Referring to FIG. 16 (16-3), the second controller 280 of the display device 200 controls the second screen image 500 to be zoomed in using the video signal (S152), and controls a size of the monitor window 400 to be maintained intact (S153). Referring again to FIG. 16 (16-3), the first controller 180 of the mobile terminal 100 controls the first screen image 300 to be zoomed in to cope with the control signal (S155).

Next, the user command is assumed to be the enlargement command. If so, it may be unnecessary for the second controller 280 of the display device 200 to transmit the control signal indicating that the enlargement command of the second screen image 500 has been input to the mobile terminal 100.

Instead, referring to FIG. 16 (16-4), the second controller 280 of the display device 200 controls the second screen image 500 to be enlarged without adjustment of the zoom level of the second screen image 500 (S152). As the second screen image 500 is enlarged, the second controller 280 of the display device 200 controls the size of the monitor window 400 to be enlarged (S156).

Moreover, referring again to FIG. 16 (16-4), because the first controller 180 of the mobile terminal 100 does not receive any control signal from the display device 200, the first screen image 300 on the first display unit 151 can be maintained as it is. Namely, the zoom level of the first screen image 300 is not adjusted (S157).

Meanwhile, the rectangular part 510 represented as a dotted line within the second screen image 500 shown in FIG. 16 (16-4) can correspond to the entire second screen image 500 shown in FIG. 16 (16-3). However, it is not mandatory for the rectangular part 510 represented as the dotted line to be displayed in FIG. 16 (16-4).

Figure 17:
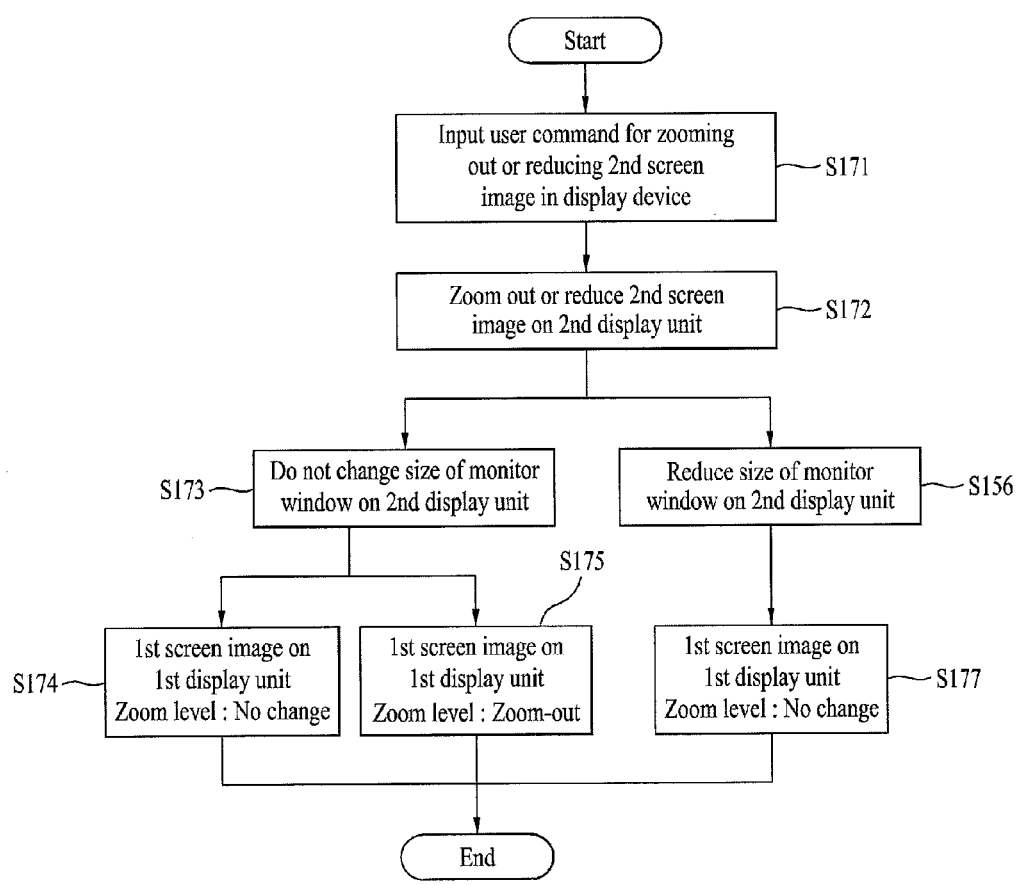
FIG. 17 is a flowchart according to an embodiment of the present invention.
Figure 18:
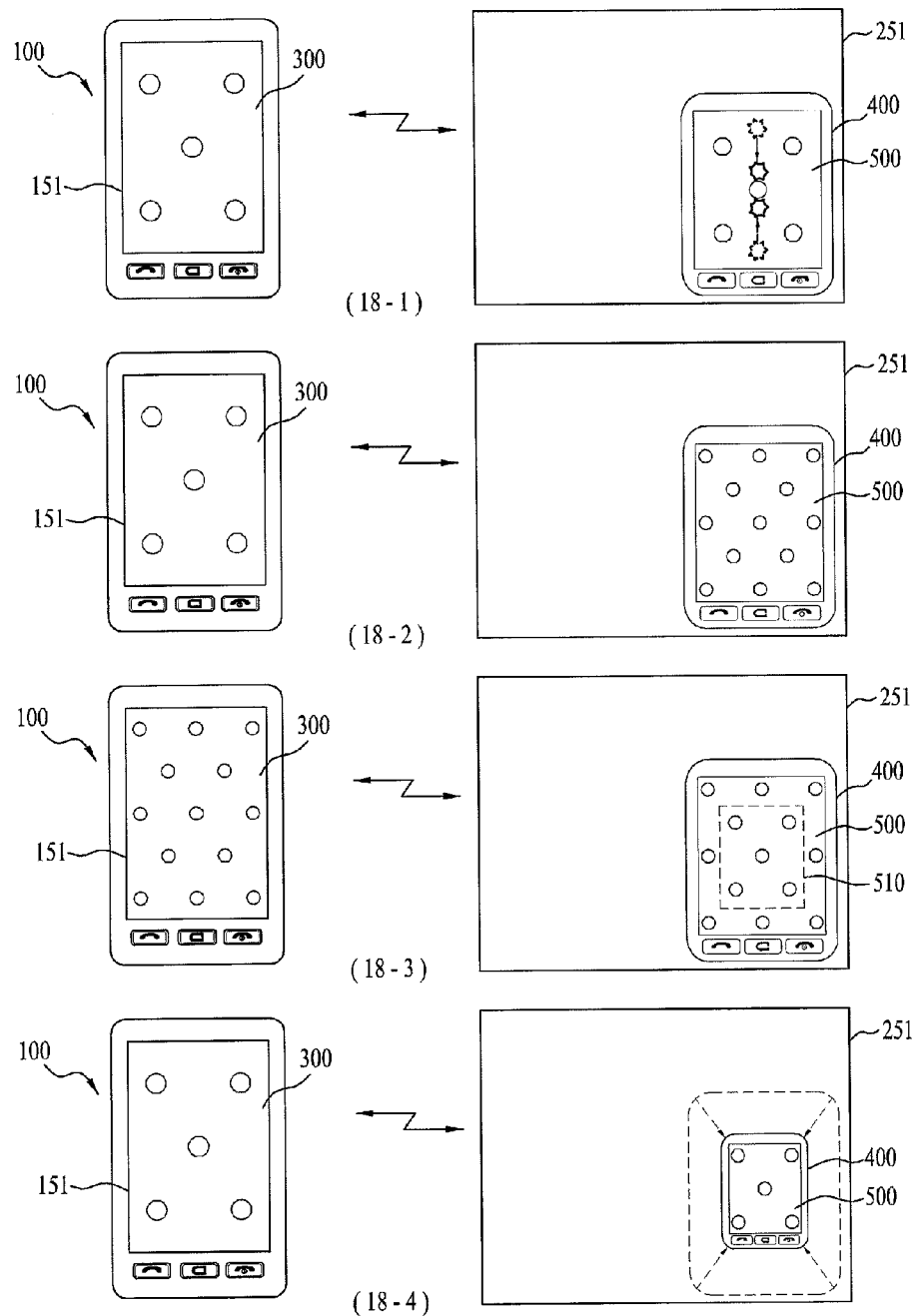
FIG. 18 is a diagram of a front side of a mobile terminal and a display unit of a display device according to an embodiment of the present invention.

The following description is made with reference to FIGS. 17 and 18. In particular, FIG. 17 is a flowchart according to an embodiment of the present invention, and FIG. 18 is a diagram of a front side of the mobile terminal 100 and a display unit of the display device 200 according to an embodiment of the present invention.

Referring to FIG. 18 (18-1), the first screen image 300 is displayed on the first display 151 of the mobile terminal 100, the monitor window 400 is displayed on the second display 251 of the display device 200, and the second screen image 500 is displayed on the monitor window 400.

In doing so, a user command for zooming out or reducing the second screen image 500 in the display device 200 can be input (S171). For instance, the user command for the zoom-out or reduction can be input by performing two touches on two positions on the second screen image 500 of the monitor window 400 of the second display unit (e.g., a touchscreen) 251 simultaneously and dragging the touches in a pinching-in direction. Alternatively, the user command for the zoom-out or reduction feature can be input via a user manipulation performed on the second user input unit 230 of the display device 200.

According to whether the user command is a command for zooming out the second screen image 500 or a command for reducing the second screen image 500, the first screen image 300 can vary more differently. This is explained in detail as follows.

First of all, the user command is assumed to be the zoom-out command. If so, the second controller 280 of the display device 200 transmits a control signal to the mobile terminal 100 to indicate that the zoom-out command of the second screen image 500 has been input. The first controller 180 of the mobile terminal 100 then transmits a video signal corresponding to the control signal to the display device 200.

Subsequently, referring to FIG. 18 (18-2), the second controller 280 of the display device 200 controls the second screen image 500 to be zoomed out using the video signal (S172), and controls a size of the monitor window 400 to be maintained intact (S173). Referring to FIG. 18 (18-2), the first controller 180 of the mobile terminal 100 controls a zoom level of the first screen image 300 to be not changed in the first display unit 151 irrespective of the control signal (S174).

The user command is still assumed to be the zoom-out command. If so, the second controller 280 of the display device 200 transmits a control signal to the mobile terminal 100 to indicate that the zoom-out command of the second screen image 500 has been input. The first controller 180 of the mobile terminal 100 then transmits a video signal corresponding to the control signal to the display device 200.

If so, referring to FIG. 18 (18-3), the second controller 280 of the display device 200 controls the second screen image 500 to be zoomed out using the video signal (S172), and controls a size of the monitor window 400 to be maintained intact (S173). Referring to FIG. 18 (18-3), the first controller 180 of the mobile terminal 100 controls the first screen image 300 to be zoomed out to cope with the control signal (S175).

Next, the user command is assumed to be the reduction command. If so, it may be unnecessary for the second controller 280 of the display device 200 to transmit the control signal, which indicates that the reduction command of the second screen image 500 has been input, to the mobile terminal 100.

Instead, referring to FIG. 18 (18-4), the second controller 280 of the display device 200 can control the second screen image 500 to be reduced (S172). As the second screen image 500 is reduced, the second controller 280 of the display device 200 can control the size of the monitor window 400 to be reduced as well (S176).

Moreover, referring to FIG. 18 (18-4), because the first controller 180 of the mobile terminal 100 does not receive any control signal from the display device 200, the first screen image 300 on the first display unit 151 can be maintained as it is. Namely, the zoom level of the first screen image 300 is not adjusted (S177).

Meanwhile, the rectangular part 510 represented as a dotted line within the second screen image 500 shown in FIG. 18 (18-4) can correspond to the entire second screen image 500 shown in FIG. 18 (18-3). However, it is not mandatory for the rectangular part 510 represented as the dotted line to be displayed in FIG. 18 (18-3).

In the above description, the second screen image 500 is zoomed in/out or enlarged/reduced in the display device 200. In the following description, the monitor window 400 being enlarged or reduced in the display device 200 is made with reference to FIGS. 19 and 20.

Figure 19:
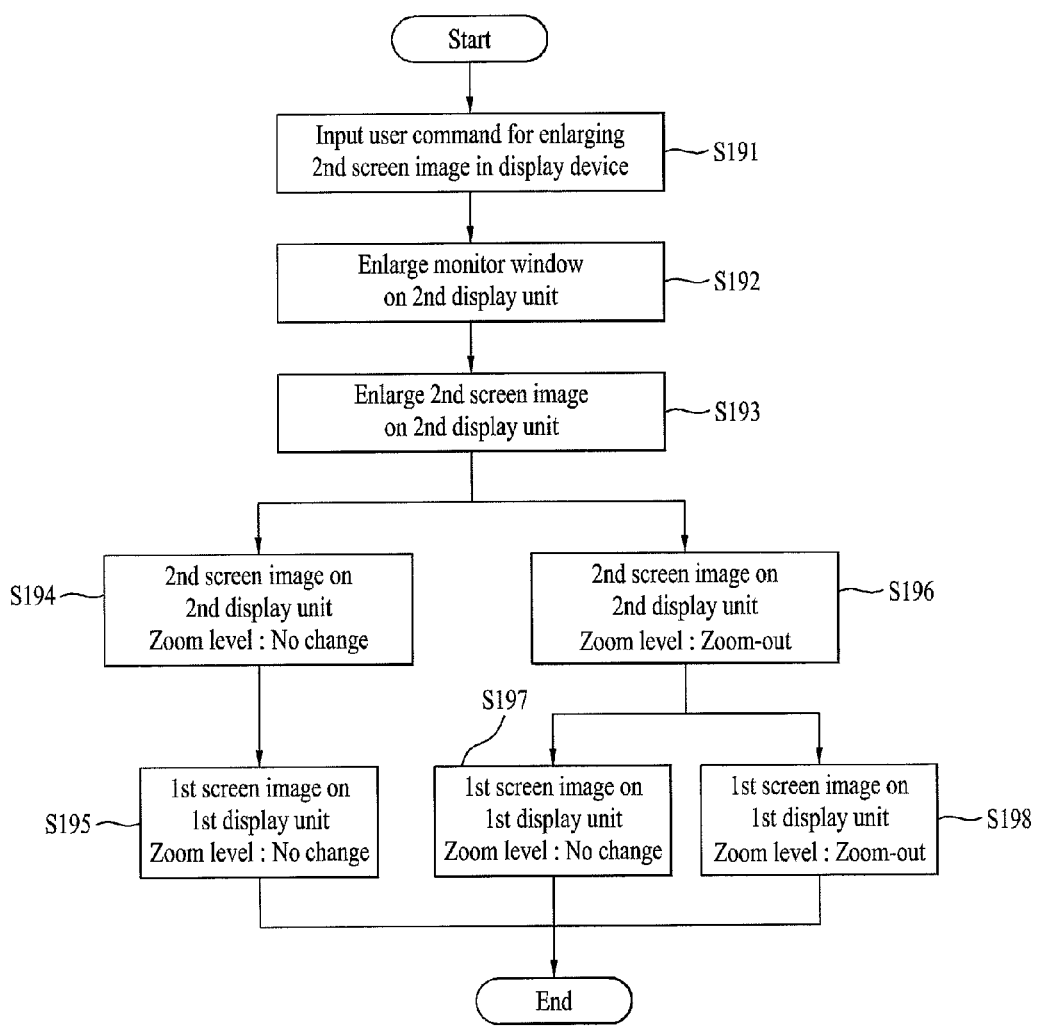
FIG. 19 is a flowchart according to an embodiment of the present invention.
Figure 20:
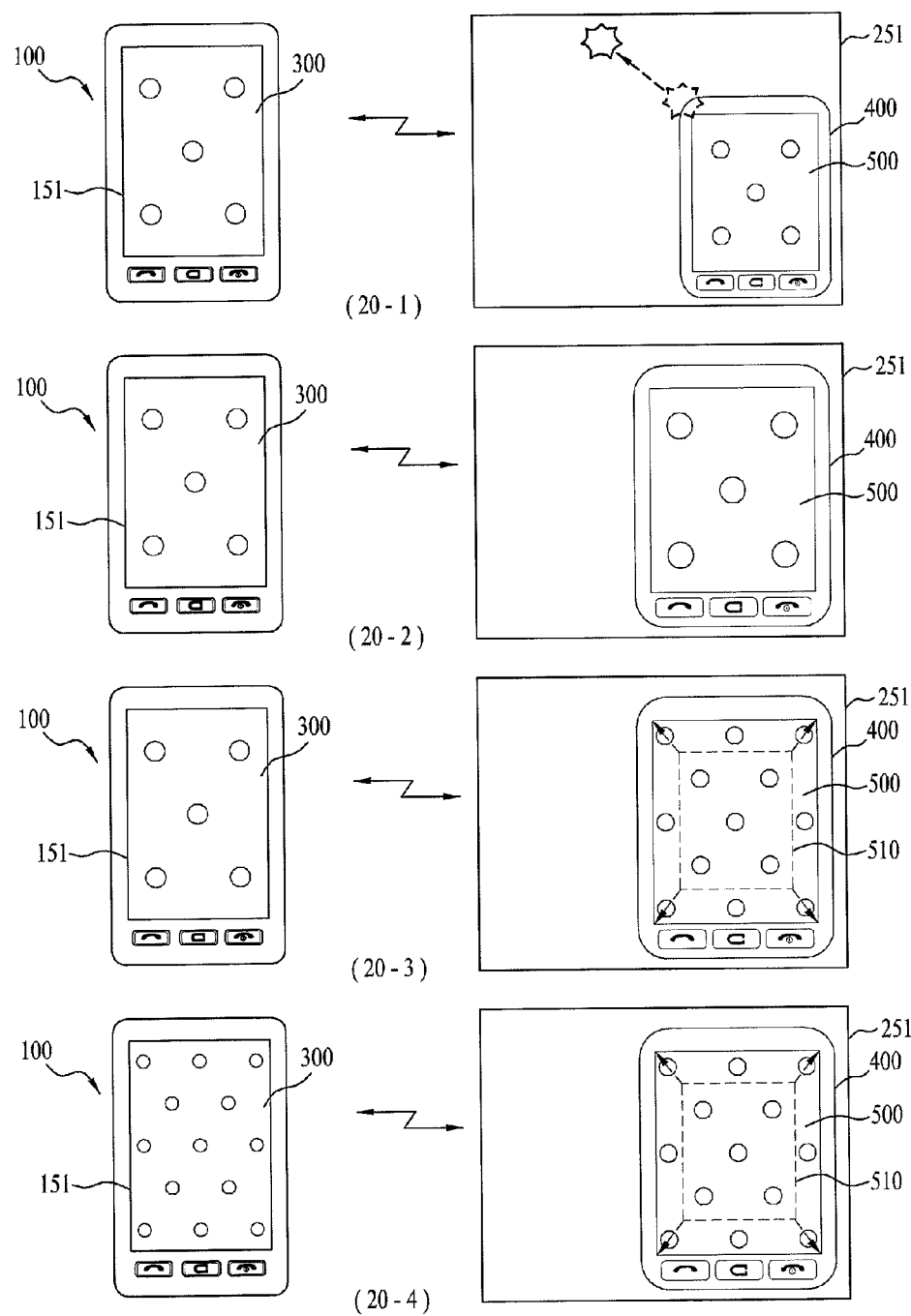
FIG. 20 is a diagram of a front side of a mobile terminal and a display unit of a display device according to an embodiment of the present invention.

In particular, FIG. 19 is a flowchart according to an embodiment of the present invention, and FIG. 20 is a diagram of a front side of the mobile terminal 100 and a display unit of the display device 200 according to an embodiment of the present invention. Referring to FIG. 20 (20-1), the first screen image 300 is displayed on the first display 151 of the mobile terminal 100, the monitor window 400 is displayed on the second display 251 of the display device 200, and the second screen image 500 is displayed on the monitor window 400.

A user command for enlarging the monitor window 400 in the display device 200 is then input (S191). For instance, the user command for the enlargement can be input by performing a touch on a corner part of the monitor window 400 and then dragging the touch in a radial direction away from a center of the monitor window 400. Alternatively, the user command for the enlargement can be input via a user manipulation performed on the second user input unit 230 of the display device 200 as well. The monitor window 400 can also be enlarged to become an entire screen in the second screen image 500.

Subsequently, referring to FIG. 20 (20-2), the second controller 280 of the display device 200 controls the monitor window 400 to be enlarged (S192). Further, the second controller 280 of the display device 200 controls the second screen image 500 to be enlarged in the enlarged monitor window 400 (S193), and controls a zoom level of the second screen image 500 to be not changed (S194).

In addition, it may not be necessary for the second controller 280 of the display device 200 to transmit a control signal, which indicates that the user command for the enlargement of the monitor window 400 has been input, to the mobile terminal 100.

Therefore, referring to FIG. 20 (20-2), because the first controller 180 of the mobile terminal 100 does not receive any control signal from the display device 200, the first screen image 300 in the first display unit 151 can be maintained as it is. Namely, a zoom level of the first screen image 300 does not change (S195). The description with reference to FIG. 20 (20-2) may have the same principle of the former description with reference to FIG. 16 (16-4).

Alternatively, when the second screen image 500 is enlarged in the enlarged monitor window 400, the second controller 280 of the display device 200 can transmit a control signal, which indicates that the user command for the enlargement of the monitor window 400 has been input, to the mobile terminal 100. If so, the first controller 180 of the mobile terminal 100 can transmit a video signal corresponding to the control signal to the display device 200.

Referring to FIG. 20 (20-3), the second controller 280 of the display device 200 can control the second screen image 500 to be zoomed out in the enlarged monitor window 400 using the video signal (S196). Referring to FIG. 20 (20-3), the first controller 180 of the mobile terminal 100 can control the zoom level of the first screen image 300 not to change in the first display unit 151 irrespective of the control signal (S197).

Alternatively, referring to FIG. 20 (20-4), when the second screen image 500 is zoomed out, the first controller 180 of the mobile terminal 100 controls the first screen image 300 to be zoomed out in the first display unit 151 to cope with the control signal (S198).

Meanwhile, the rectangular part 510 represented as a dotted line within the second screen image 500 shown in FIG. 20 (20-3) or (20-4) can correspond to the entire second screen image 500 shown in FIG. 20 (20-1). However, it is not mandatory for the rectangular part 510 represented as the dotted line to be displayed in FIG. 20 (20-4).

Figure 21:
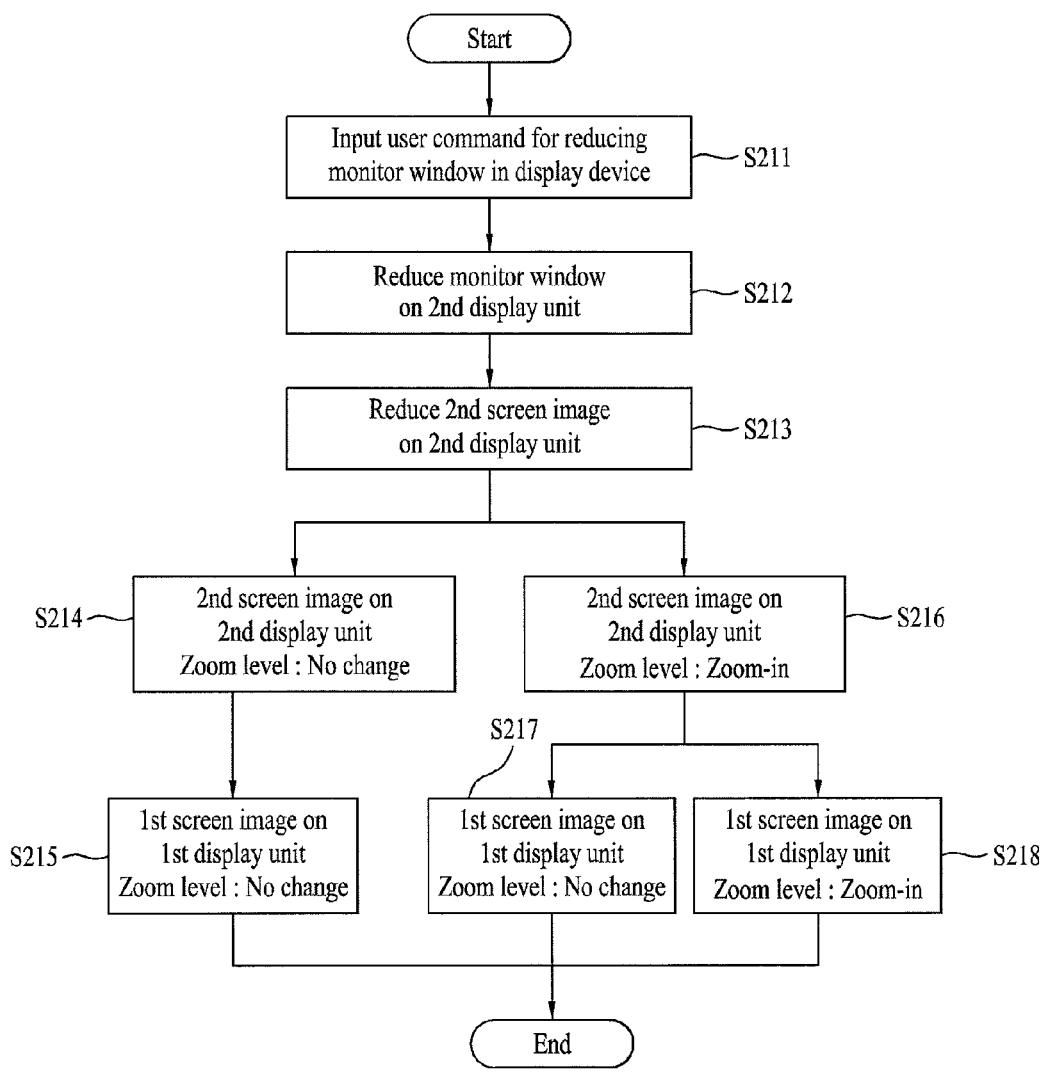
FIG. 21 is a flowchart according to an embodiment of the present invention.
Figure 22:
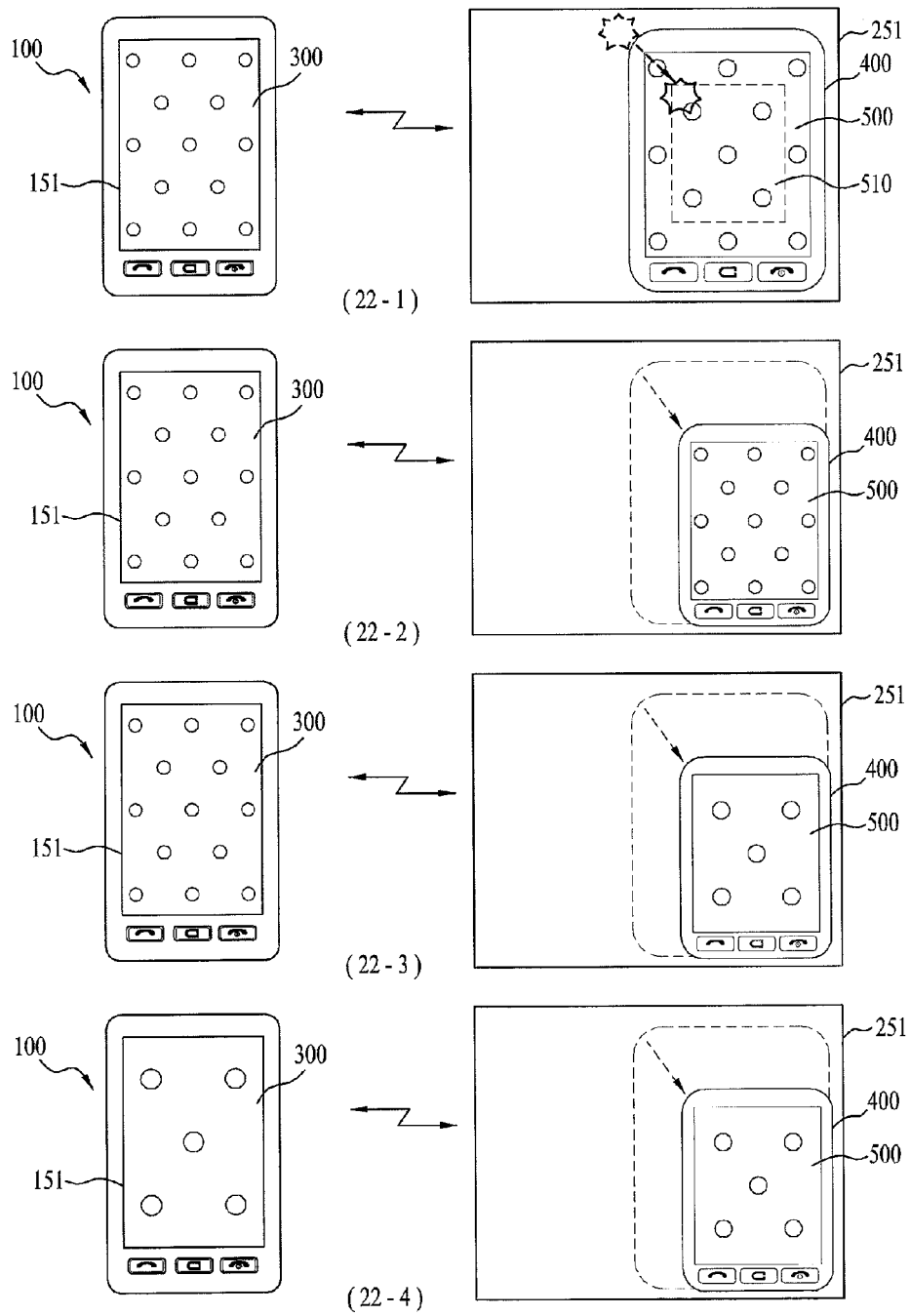
FIG. 22 is a diagram of a front side of a mobile terminal and a display unit of a display device according to an embodiment of the present invention.

The following description is made with reference to FIGS. 21 and 22. In particular, FIG. 21 is a flowchart according to an embodiment of the present invention, and FIG. 22 is a diagram of a front side of the mobile terminal 100 and a display unit of the display device 200 according to an embodiment of the present invention.

Referring to FIG. 22 (22-1), the first screen image 300 is displayed on the first display 151 of the mobile terminal 100, the monitor window 400 is displayed on the second display 251 of the display device 200, and the second screen image 500 is displayed on the monitor window 400.

A user command for reducing the monitor window 400 in the display device 200 is then input (S211). For instance, the user command for the reduction can be input by performing a touch on a corner part of the monitor window 400 and then dragging the touch in a radial direction toward a center of the monitor window 400. Alternatively, the user command for the reduction can be input via a user manipulation performed on the second user input unit 230 of the display device 200 as well.

Subsequently, referring to FIG. 22 (22-2), the second controller 280 of the display device 200 controls the monitor window 400 to be reduced (S212). In addition, the second controller 280 of the display device 200 controls the second screen image 500 to be reduced in the reduced monitor window 400 (S213). However, the second controller 280 of the display device 200 can control a zoom level of the second screen image 500 not to be changed (S214).

Further, it may not be necessary for the second controller 280 of the display device 200 to transmit a control signal, which indicates that the user command for the reduction of the monitor window 400 has been input, to the mobile terminal 100.

Therefore, referring to FIG. 22 (22-2), because the first controller 180 of the mobile terminal 100 does not receive any control signal from the display device 200, the first controller 180 can maintain the first screen image 300 in the first display unit 151 as it is. Namely, a zoom level of the first screen image 300 does not change (S215).

The description with reference to FIG. 22 (22-2) may have the same principle of the former description with reference to FIG. 18 (18-4). Alternatively, when the second screen image 500 is reduced in the reduced monitor window 400, the second controller 280 of the display device 200 can transmit a control signal, which indicates that the user command for the reduction of the monitor window 400 has been input, to the mobile terminal 100. If so, the first controller 180 of the mobile terminal 100 can transmit a video signal corresponding to the control signal to the display device 200.

If so, referring to FIG. 22 (22-3), the second controller 280 of the display device 200 controls the second screen image 500 to be zoomed in using the video signal (S216). Referring to FIG. 22 (22-3), the first controller 180 of the mobile terminal 100 can control the zoom level of the first screen image 300 not to change in the first display unit 151 irrespective of the control signal (S217).

Alternatively, referring to FIG. 22 (22-4), when the second screen image 500 is zoomed in, the first controller 180 of the mobile terminal 100 can control the first screen image 300 to be zoomed in on the first display unit 151 to cope with the control signal (S218). Meanwhile, the rectangular part 510 represented as a dotted line within the second screen image 500 shown in FIG. 22 (22-1) can correspond to the entire second screen image 500 shown in FIG. 22 (22-4). However, it is not mandatory for the rectangular part 510 represented as the dotted line to be displayed in FIG. 22 (22-1).

Figure 23:
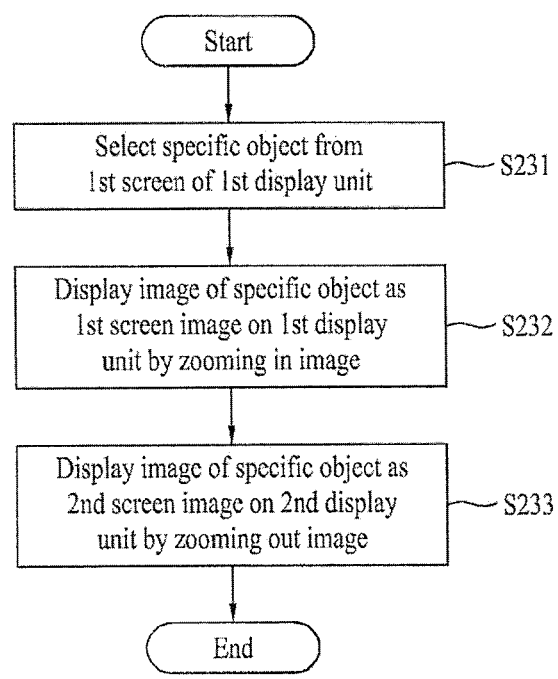
FIG. 23 is a flowchart according to an embodiment of the present invention.

The following description is made with reference to FIGS. 23 and 24. In particular, FIG. 23 is a flowchart according to an embodiment of the present invention, and FIG. 24 is a diagram of a front side of the mobile terminal 100 and a display unit of the display device 200 according to an embodiment of the present invention.

Referring to FIG. 24 (24-1), the first screen image 300 is displayed on the first display 151 of the mobile terminal 100, the monitor window 400 is displayed on the second display 251 of the display device 200, and the second screen image 500 is displayed on the monitor window 400. A specific one object (e.g., an object C) can be touched and selected from first objects displayed on the first screen image 300 in the mobile terminal 100 (S231).

Subsequently, the first controller 180 of the mobile terminal 100 controls an image corresponding to the specific object to be displayed as the first screen image 300 on the first display unit 151 as being zoomed in at a specific zoom level (S232).

Further, the first controller 180 of the mobile terminal 100 can provide a picture of the image as information on the first screen image 300 to the display device 200. If so, referring to FIG. 24 (24-2), the second controller 280 of the display device 200 controls the picture of the image to be displayed as the second screen image 500 on the second display unit 251 as being zoomed out at a level lower than the specific zoom level (S233). In this instance, the picture of the image can be displayed as being fully zoomed out. The picture of the image can also be displayed as an entire screen on the second display unit 251.

Moreover, the second controller 280 of the display device 200 controls a region 510 corresponding to the first screen image 300 to be displayed on the second display unit 251 as being visually discriminated. Afterwards, a touch can be performed on the first display unit 151 of the mobile terminal 100 and can be then dragged in a prescribed direction.

If so, referring to FIG. 24 (24-3), the first controller 180 of the mobile terminal 100 controls the first screen image 300 to be scrolled in the prescribed direction. The second controller 280 of the display device 200 then controls the region 510 corresponding to the scrolled first screen image 300 to be displayed as being visually discriminated.

How the monitor window 400 is generated from the second display 251 of the display device 200 when the mobile terminal 100 and the display device 200 are connected to each other will now be explained with reference to FIGS. 25 and 26. In particular, FIG. 25 is a flowchart according to an embodiment of the present invention, and FIG. 26 is a diagram of a front side of the mobile terminal 100 and a display unit of the display device 200 according to an embodiment of the present invention.

Figure 25:
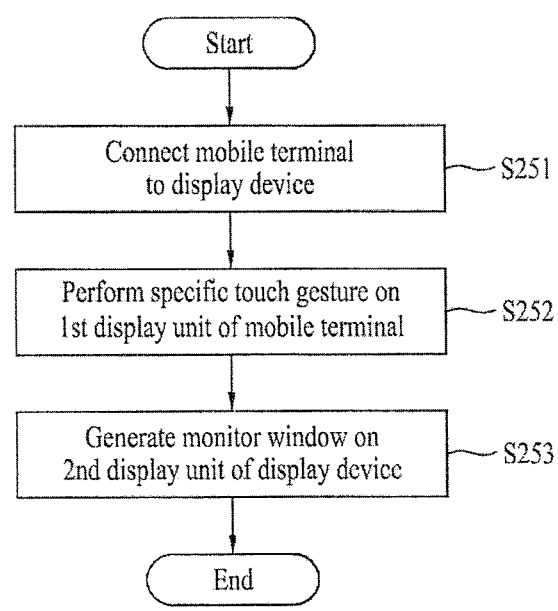
FIG. 25 is a flowchart according to an embodiment of the present invention.

Referring to FIGS. 25 and 26, as mentioned in the foregoing description, the mobile terminal 100 and the display device 200 can be connected to each other (S251). Referring to FIG. 26 (26-1), at least one of the first controller 180 of the mobile terminal 100 and the second controller 280 of the display device 200 can control the monitor window 400 not to be directly generated from the second display unit 251 even if the mobile terminal 100 and the display device 200 are connected to each other.

For instance, referring to FIG. 26 (26-1), the first controller 180 of the mobile terminal 100 can control information on the first screen image 300 not to be provided. Alternatively, the second controller 280 of the display device 200 can control the monitor window 400 not to be generated from the second display unit 251 irrespective of whether the information on the first screen image 300 is received from the mobile terminal 100.

Subsequently, a prescribed user command for enabling the monitor window 400 to be generated from the second display unit 251 can be input to the mobile terminal 100 (S252). For instance, the user command for generating the monitor window 400 can be input by performing a touch and drag on the first display unit (e.g., touchscreen) 151 along with a straight line trace in one direction or a trace of a specific pattern. Alternatively, the user command for generating the monitor window 400 can be input via a user manipulation performed on the first user input unit 130 of the mobile terminal 100.

When the prescribed user command is input, referring to FIG. 26 (26-2), at least one of the first controller 180 of the mobile terminal 100 and the second controller 280 of the display device 200 can control the monitor window 400 to be generated from the second display unit 251 of the display device 200 (S253).

For instance, the first controller 180 of the mobile terminal 100 can provide the display device 200 with a control signal indicating that the prescribed user command has been input. The first controller 180 of the mobile terminal 100 can also provide the display device 200 with information on the first screen image 300.

If so, referring to FIG. 26 (26-2), the second controller 280 of the display device 200 can control the monitor window 400 to be generated from the second display unit 251 in response to the control signal. The second controller 280 of the display device 200 can also control the second screen image 500 to be displayed on the monitor window 400 using the information on the first screen image 300 provided by the mobile terminal 100.

Meanwhile, referring to FIG. 26 (26-3), when the monitor window 400 is generated from the display device 200, the first controller 180 of the mobile terminal 100 controls the power consumption of the mobile terminal 100 to be saved by automatically turning off the first display unit 151 not to display the first screen image 300. Optionally, when the mobile terminal 100 and the display device 200 are disconnected from each other, if the first display 151 of the mobile terminal 100 is automatically turned on, the first controller 180 of the mobile terminal 100 can control the first screen image 300 to be displayed again in the first display 151.

How the monitor window 400 displayed on the second display unit 251 changes according to a distance between the mobile terminal 100 and the display device 200 or a communication signal strength after the mobile terminal 100 and the display device 200 have been connected to each other will now be explained with reference to FIGS. 27 and 28.

Figure 27:
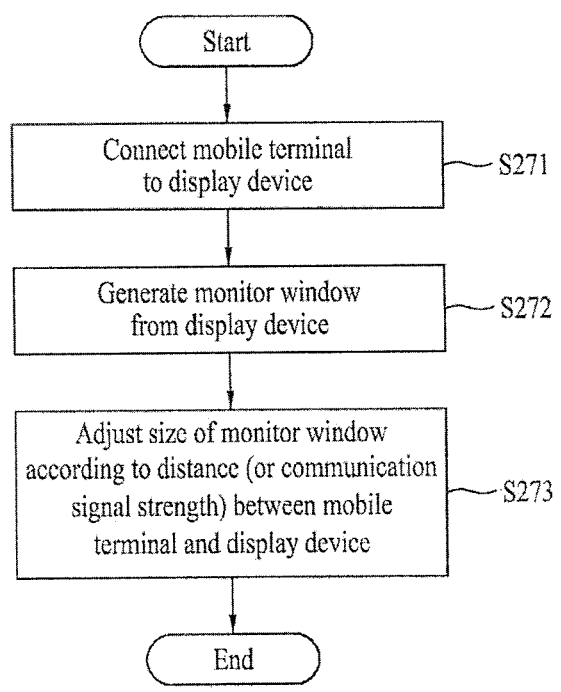
FIG. 27 is a flowchart according to an embodiment of the present invention.

In particular, FIG. 27 is a flowchart according to an embodiment of the present invention, and FIG. 28 is a diagram of a front side of the mobile terminal 100 and a display unit of the display device 200 according to an embodiment of the present invention. Referring to FIGS. 27 and 28, as mentioned in the foregoing description, the mobile terminal 100 and the display device 200 can be connected to each other (S271). If so, as mentioned in the foregoing description, referring to FIG. 28 (28-1), the monitor window 400 can be displayed on the second display 251 of the display device 200 (S272).

A terminal user can then change a spaced distance between the mobile terminal 100 and the display device 200 by shifting at least one of the mobile terminal 100 and the display device 200. When the mobile terminal 100 and the display device 200 are wirelessly connected to each other, the variation of the spaced distance in-between can bring a variation of a communication signal strength in-between.

If so, at least one of the first controller 180 of the mobile terminal 100 and the second controller 280 of the display device 200 can vary a size of the monitor window 400 according to the communication signal strength (S273). In particular, the second controller 280 of the display device 200 controls the size of the monitor window 400 to vary according to the communication signal strength, and controls a second screen image 500 to be displayed on the monitor window 400 as being enlarged or reduced to fit the size of the monitor window 400.

Moreover, the first controller 180 of the mobile terminal 100 can provide the display device 200 with information on a first screen image 300 corresponding to the monitor window 400 having the size varying according to the communication signal strength.

Referring to FIG. 28 (28-2), if the communication signal strength becomes stronger as the spaced distance between the mobile terminal 100 and the display device 200 decreases, at least one of the first controller 180 of the mobile terminal 100 and the second controller 280 of the display device 200 can control the size of the monitor window 400 to increase according to the stronger communication signal strength.

Referring to FIG. 28 (28-3), if the communication signal strength is weakened as the spaced distance between the mobile terminal 100 and the display device 200 increases, at least one of the first controller 180 of the mobile terminal 100 and the second controller 280 of the display device 200 can control the size of the monitor window 400 to decrease according to the weakened communication signal strength. Also, if the communication between the mobile terminal 100 and the display device 200 is disconnected as the spaced distance increases enough, the monitor window 400 can disappear from the second display unit 251.

How the monitor window 400 displayed on the second display unit 251 varies when a user input is not performed on the mobile terminal 100 for a prescribed period of time will now be explained with reference to FIGS. 29 and 30.

Figure 29:
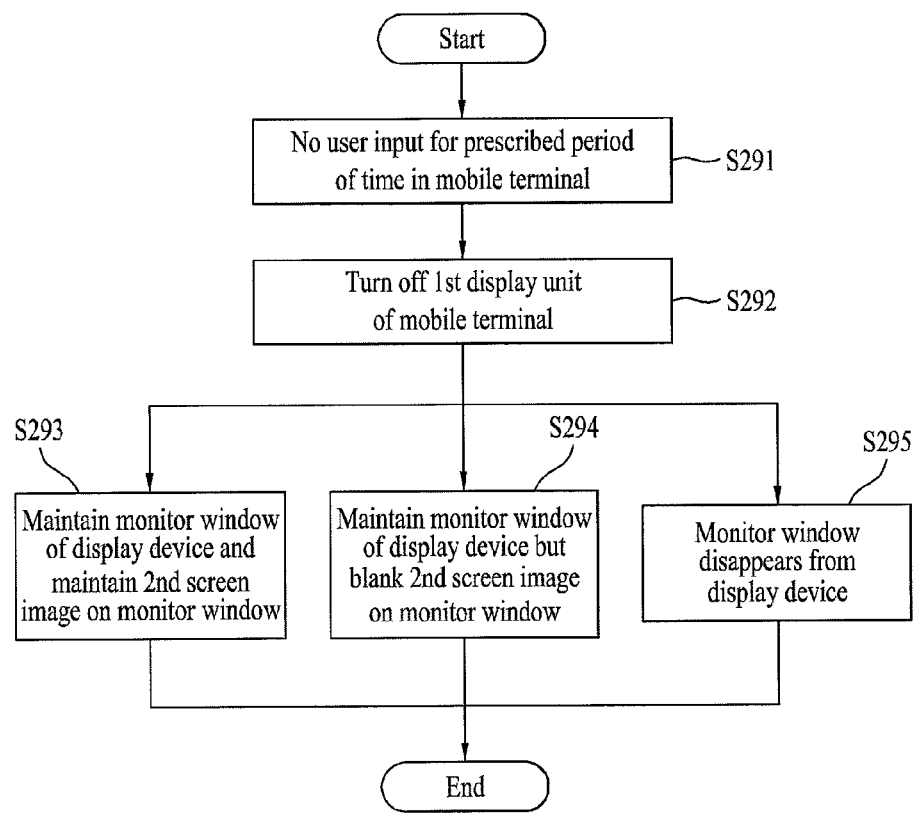
FIG. 29 is a flowchart according to an embodiment of the present invention.

In particular, FIG. 29 is a flowchart according to an embodiment of the present invention, and FIG. 30 is a diagram of a front side of the mobile terminal 100 and a display unit of the display device 200 according to an embodiment of the present invention.

Referring to FIGS. 29 and 30, after the mobile terminal 100 and the display device 200 have been connected to each other, a user input may not be performed on the mobile terminal 100 for a prescribed period of time (S291). No user input in the mobile terminal 100 means that the touchscreen or user input unit 130 of the mobile terminal 100 is not manipulated.

Afterwards, as the first display unit 151 is automatically turned off, the first controller 180 of the mobile terminal 100 can control the first screen image 300 not to be further displayed (S292). Also, if a user input is performed on the mobile terminal 100, the display unit 151 can be automatically turned on.

Subsequently, the first controller 180 of the mobile terminal 100 provides the display device 200 with a control signal, which indicates that the user input has not been performed on the mobile terminal 100 for the prescribed period of time, if necessary. If so, referring to FIG. 30 (30-1), the second controller 280 of the display device 200 keeps displaying the monitor window 400 on the second display unit despite that the first display unit 151 of the mobile terminal 100 is turned off, and controls the second screen image 500 to keep being displayed on the monitor window 400 (S293).

Alternatively, referring to FIG. 30 (30-2), in response to the control signal indicating that the first display 151 of the mobile terminal 100 has been turned off, the second controller 280 of the display device 200 keeps displaying the monitor window 400 on the second display unit 251, but controls the second screen image 500 to be not displayed on the monitor window 400 (S294). In particular, the second screen image 500 can be blanked on the monitor window 400.

If a control signal indicating that the first display unit 151 is turned on is received from the mobile terminal 100, the second controller 280 of the display device 200 controls the second screen image 500 to be displayed again on the monitor window 400. Alternatively, referring to FIG. 30 (30-3), in response to the control signal indicating that the first display 151 of the mobile terminal 100 has been turned off, the second controller 280 of the display device 200 can control the monitor window 400 not to be displayed on the second display unit 251. When the monitor window 400 is not displayed, the second screen image 500 is not displayed on the monitor window 400.

If a control signal indicating that the first display unit 151 is turned on is received from the mobile terminal 100, the second controller 280 of the display device 200 controls the monitor window 400 to be displayed again, and controls the second screen image 500 to be displayed again on the monitor window 400. After the mobile terminal 100 and the display device 200 have been connected to each other and a prescribed event occurs in the mobile terminal 100, the monitor window 400 can change. This feature will now be explained with reference to FIGS. 31 and 32.

Figure 31:
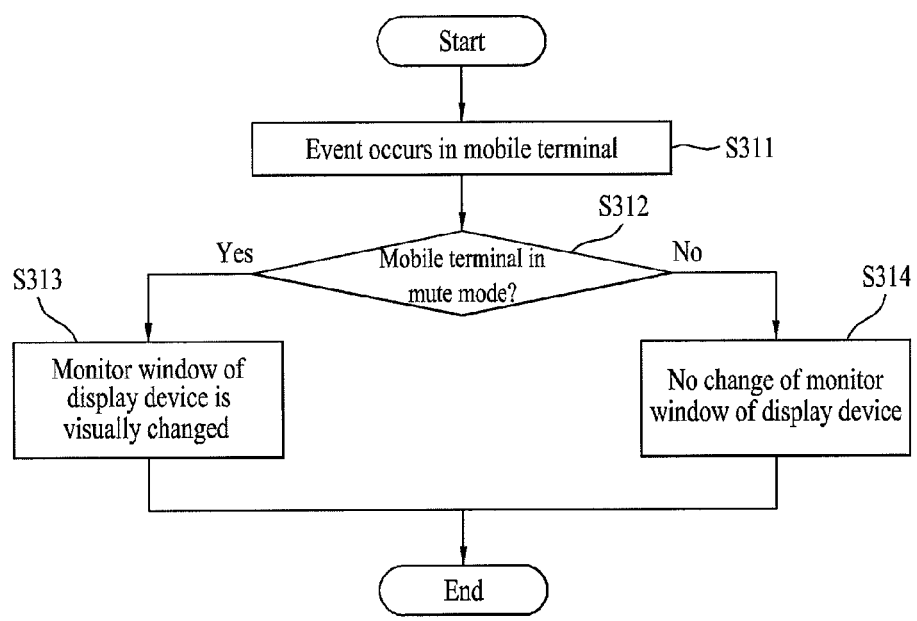
FIG. 31 is a flowchart according to an embodiment of the present invention.

In particular, FIG. 31 is a flowchart according to an embodiment of the present invention, and FIG. 32 is a diagram of a front side of the mobile terminal 100 and a display unit of the display device 200 according to an embodiment of the present invention. First, an 'event' corresponds to a specific function being executed without a user input in the mobile terminal 100 during a normal operation of the mobile terminal 100. For example, the event can include one of a phone call reception, a message reception and the like. The following description assumes the event includes the phone call reception, by which the present embodiment is non-limited.

Referring to FIGS. 31 and 32, as mentioned in the foregoing description, the mobile terminal 100 and the display device 200 can be connected to each other (S311). If so, the monitor window 400 is generated from the second display 251 of the display device 200 and the second screen image 500 can be displayed on the monitor window 400.

Afterwards, a phone call reception even can occur in the mobile terminal 100. If so, the first screen image 300 on the display unit 151 of the mobile terminal 100 can be changed into an image corresponding to the phone call reception event. Accordingly, the second screen image 500 on the second display 251 of the display device 200 can be changed into the image corresponding to the phone call reception event, which is optional.

If so, the first controller 180 of the mobile terminal 100 determines whether the mobile terminal 100 is currently in a mute mode. In this instance, the mute mode may mean the mode set for muting an alarm sound indicating an occurrence of an event in the mobile terminal 100. Also, the mute mode can include a vibration mode for generating a vibration indicating an occurrence of an event in the mobile terminal 100.

As a result of the determination, if the mobile terminal 100 is in the mute mode, the first controller 180 of the mobile terminal 100 provides the display device 200 with a first control signal indicating that the event has occurred in the mobile terminal 100 and that the mobile terminal 100 is in the mute mode.

Then, in response to the first control signal, the second controller 280 of the display device 200 controls the monitor window 400 to be visually changed in the second display unit 251. Referring to FIG. 32 (32-2), the monitor window 400 vibrates on the second display unit 251 according to the first control signal, by which the present embodiment is non-limited. Optionally, at least one of a color, shape and size of the monitor window 400 can be changed in response to the first control signal.

On the contrary, as a result of the determination, if the mobile terminal 100 is not in the mute mode, the first controller 180 of the mobile terminal 100 provides the display device 200 with a second control signal indicating that the event has occurred in the mobile terminal 100 and that the mobile terminal 100 is not in the mute mode.

Then, in response to the second control signal, the second controller 280 of the display device 200 controls the monitor window 400 to be maintained intact without being visually changed in the second display unit 251.

If the mobile terminal 100 is not in the mute mode, the first controller 180 of the mobile terminal 100 does not send any control signal to the display device 200. Therefore, the second controller 280 of the display device 200 can control the monitor window 400 to keep being displayed as it is.

As mentioned in the foregoing description, the present invention is applicable to such a mobile terminal as a mobile phone, a smart phone, a notebook computer e.g., a laptop), a digital broadcast terminal, a PDA (personal digital assistants), a PMP (portable multimedia player), a navigation system and the like and/or such a display device as a notebook computer (e.g., laptop), a tablet computer, a desktop computer, a television set (e.g., a digital TV set, a smart TV set, etc.) and the like.

It will be apparent to those skilled in the art that various modifications and variations can be specified into other form(s) without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
an interface unit configured to be connected to a mobile terminal having a first display unit displaying a mobile screen image;
a second display unit for displaying a monitor window; and
a controller configured to:
display the monitor window in a first orientation direction for displaying a monitor screen image corresponding to the mobile screen image on the second display unit;
maintain the monitor window in the first orientation direction even though an orientation direction of the mobile screen image is changed from a first orientation direction to a second orientation direction;
receive a user command relating to a modification of the mobile screen image;
transmit a control signal relating to the user command to the mobile terminal; and
display the monitor window in a second orientation direction with a modified monitor screen image based on the user command, even though an orientation direction of a housing of the mobile terminal is not changed.

2. The display device of claim 1, wherein the user command intends to change the orientation direction of the monitor window from the first orientation direction to the second orientation direction.

3. The display device of claim 2, wherein the first orientation direction of the monitor window is a horizontal direction and the second orientation direction of the monitor window is a vertical direction.

4. The display device of claim 1, wherein the user command is received through a touchscreen.

5. The display device of claim 1, wherein the mobile screen image and the monitor screen image share a content image related to a menu or application executed in the mobile terminal.

6. The display device of claim 1, wherein the monitor window has a substantially identical shape to one face of the housing of the mobile terminal.

7. The display device of claim 1, wherein the controller is configured to display the monitor window at a position on the second display unit regardless of a display position of at least one object that is previously displayed on the second display unit.

8. The display device of claim 1, wherein the controller is configured to display the monitor window at a position on the second display unit to avoid blocking at least one object that is previously displayed on the second display unit.

9. The display device of claim 1, wherein in response to a user command for zooming-in the monitor screen image, the controller is configured to transmit information related to the user command for zooming-in the monitor screen image to the mobile terminal, and receive a video signal from the mobile terminal corresponding to the information while a size of the monitor window is maintained.

10. The display device of claim 1, wherein in response to a user command for zooming-out the monitor screen image, the controller is configured to transmit information related to the user command for zooming-out the monitor screen image to the mobile terminal, and receive a video signal from the mobile terminal corresponding to the information while a size of the monitor window is maintained.

11. The display device of claim 1, wherein in response to a user command for enlarging the monitor window, the controller is configured to control the monitor window to be enlarged and control the monitor screen image to be enlarged within the enlarged monitor window while a zoom level of the monitor screen image is not changed.

12. The display device of claim 1, wherein in response to a user command for enlarging the monitor window, the controller is configured to control the monitor window to be enlarged and transmit information to the mobile terminal, the information indicating the user command for enlarging the monitor window is input, and the controller is configured to receive a video signal from the mobile terminal corresponding to the information and control the monitor screen image to be enlarged within the enlarged monitor window using the video signal.

13. The display device of claim 1, wherein in response to a user command for reducing the monitor window, the controller is configured to control the monitor window to be reduced and control the monitor screen image to be reduced within the reduced monitor window while a zoom level of the monitor screen image is not changed.

14. The display device of claim 1, wherein in response to a user command for reducing the monitor window, the controller is configured to control the monitor window to be reduced and transmit information to the mobile terminal, the information indicating the user command for reducing the monitor window is input, and the controller is configured to receive a video signal from the mobile terminal corresponding to the information and control the monitor screen image to be reduced within the reduced monitor window using the video signal.

15. The display device of claim 1, wherein in response to a predetermined event occurring in the mobile terminal, the controller is configured to control the monitor window to be visually changed in the second display unit.

16. The display device of claim 1, wherein in response to a predetermined event occurring in the mobile terminal, the controller is configured to display an alarm message indicating the predetermined event occurs on the monitor window.

17. The display device of claim 1, wherein in response to information being received from the mobile terminal, the information indicating a predetermined event has occurred in the mobile terminal and the mobile terminal is not in a mute mode, the controller is configured to control the monitor window to be maintained without being visually changed in the second display unit.

18. A method for displaying a monitor screen image in a display device having a second display unit for displaying a monitor window, the method comprising:
interfacing to a mobile terminal having a first display unit displaying a mobile screen image;
displaying the monitor window in a first orientation direction for displaying the monitor screen image corresponding to the mobile screen image on the second display unit;
maintaining the monitor window in the first orientation direction even though an orientation direction of the mobile screen image is changed from a first orientation direction to a second orientation direction;
receiving a user command relating to a modification of the mobile screen image;
transmitting a control signal relating to the user command to the mobile terminal; and
displaying the monitor window in a second orientation direction with a modified monitor screen image based on the user command, even though an orientation direction of a housing of the mobile terminal is not changed.

19. The method of claim 18, wherein the user command intends to change the orientation direction of the monitor window from the first orientation direction to the second orientation direction.

20. The method of claim 19, wherein the first orientation direction of the monitor window is a horizontal direction and the second orientation direction of the monitor window is a vertical direction.

21. The method of claim 18, wherein the user command is received through a touchscreen.

22. The method of claim 18, wherein the mobile screen image and the monitor screen image share a content image related to a menu or application executed in the mobile terminal.

23. The method of claim 18, wherein the monitor window has a substantially identical shape to one face of the housing of the mobile terminal.

24. The method of claim 18, further comprising:
displaying the monitor window at a position on the second display unit regardless of a display position of at least one object that is previously displayed on the second display unit.

25. A system, comprising:
a mobile terminal having a first display unit displaying a mobile screen image; and
a display device including a second display unit for displaying a monitor window and a controller,
wherein the controller of the display device is configured to:
interface to the mobile terminal having the first display unit displaying the mobile screen image;
display the monitor window in a first orientation direction for displaying a monitor screen image corresponding to the mobile screen image on the second display unit;
maintain the monitor window in the first orientation direction even though an orientation direction of the mobile screen image is changed from a first orientation direction to a second orientation direction;
receive a user command relating to a modification of the mobile screen image;
transmit a control signal relating to the user command to the mobile terminal; and
display the monitor window in a second orientation direction with a modified monitor screen image based on the user command, even though an orientation direction of the housing of the mobile terminal is not changed.

* * * * *